(12) United States Patent
Abe

(10) Patent No.: US 12,260,586 B2
(45) Date of Patent: Mar. 25, 2025

(54) INFORMATION PROCESSING DEVICE, MOBILE DEVICE, INFORMATION PROCESSING SYSTEM, AND METHOD

(71) Applicant: SONY GROUP CORPORATION, Tokyo (JP)

(72) Inventor: Shinichiro Abe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/999,556

(22) PCT Filed: Nov. 26, 2020

(86) PCT No.: PCT/JP2020/043960
§ 371 (c)(1),
(2) Date: Nov. 21, 2022

(87) PCT Pub. No.: WO2021/250914
PCT Pub. Date: Dec. 16, 2021

(65) Prior Publication Data
US 2023/0206491 A1    Jun. 29, 2023

(30) Foreign Application Priority Data

Jun. 9, 2020  (JP) ................................. 2020-099835

(51) Int. Cl.
*G06T 7/73* (2017.01)
*B64U 20/87* (2023.01)
(Continued)

(52) U.S. Cl.
CPC ................ *G06T 7/74* (2017.01); *B64U 20/87* (2023.01); *G06T 11/00* (2013.01); *H04N 5/2628* (2013.01);
(Continued)

(58) Field of Classification Search
None
See application file for complete search history.

(56) References Cited

U.S. PATENT DOCUMENTS 11,691,756 B1 *   7/2023  Ludington ............ B64C 39/024
                                                        701/16
2017/0132566 A1 *  5/2017  High ...................... B64D 47/08
(Continued)

FOREIGN PATENT DOCUMENTS

CN          105599912 A       5/2016
JP          10-255069 A       9/1998
(Continued)

OTHER PUBLICATIONS

International Search Report and Written Opinion of PCT Application No. PCT/JP2020/043960, issued on Jan. 19, 2021, 11 pages of ISRWO.

*Primary Examiner* — Heather R Jones
(74) *Attorney, Agent, or Firm* — CHIP LAW GROUP

(57) ABSTRACT

Provided is a data processing unit of a user terminal that sets a real object included in a camera-captured image as a marker, generates marker reference coordinates with a configuration point of the set marker as an origin, and transmits position data on the marker reference coordinates to a mobile device. The data processing unit transforms the destination position of the drone or the position of the tracking target from the coordinate position on the user terminal camera coordinates to the coordinate position on the marker reference coordinates, and transmits the transformed coordinate position to the drone. The data processing unit receives the movement path from the drone as coordinate position data on the marker reference coordinates, transforms the coordinate position data into a coordinate (Continued)

position on the user terminal camera coordinates, and displays the path information on the display unit.

17 Claims, 31 Drawing Sheets

(51) Int. Cl.
    *G06T 11/00*     (2006.01)
    *H04N 5/262*     (2006.01)
    *H04N 7/18*     (2006.01)
    *B64U 101/30*     (2023.01)

(52) U.S. Cl.
    CPC ......... *H04N 7/183* (2013.01); *B64U 2101/30* (2023.01); *B64U 2201/10* (2023.01); *B64U 2201/20* (2023.01); *G06T 2207/10032* (2013.01); *G06T 2207/20101* (2013.01); *G06T 2207/30204* (2013.01); *G06T 2207/30244* (2013.01)

(56) References Cited

U.S. PATENT DOCUMENTS

| | | | |
|---|---|---|---|
| 2018/0362185 A1* | 12/2018 | Qian | G05D 1/0094 |
| 2019/0213438 A1* | 7/2019 | Jones | G06V 40/10 |

FOREIGN PATENT DOCUMENTS

| | | | |
|---|---|---|---|
| JP | 2006-051864 A | | 2/2006 |
| JP | 5192598 B1 | | 5/2013 |
| JP | 2016-197342 A | | 11/2016 |
| JP | 2016-211973 A | | 12/2016 |
| JP | 2018-186509 A | | 11/2018 |
| JP | 2019032234 A | * | 2/2019 |
| JP | 2019-511044 A | | 4/2019 |
| JP | 2019-121364 A | | 7/2019 |
| JP | 2020-042366 A | | 3/2020 |
| JP | 6736147 B1 | | 8/2020 |
| KR | 10-2018-0023258 A | | 3/2018 |
| WO | 2015/163012 A1 | | 10/2015 |
| WO | 2018/034295 A1 | | 2/2018 |
| WO | 2019/138466 A1 | | 7/2019 |

* cited by examiner

FIG. 8
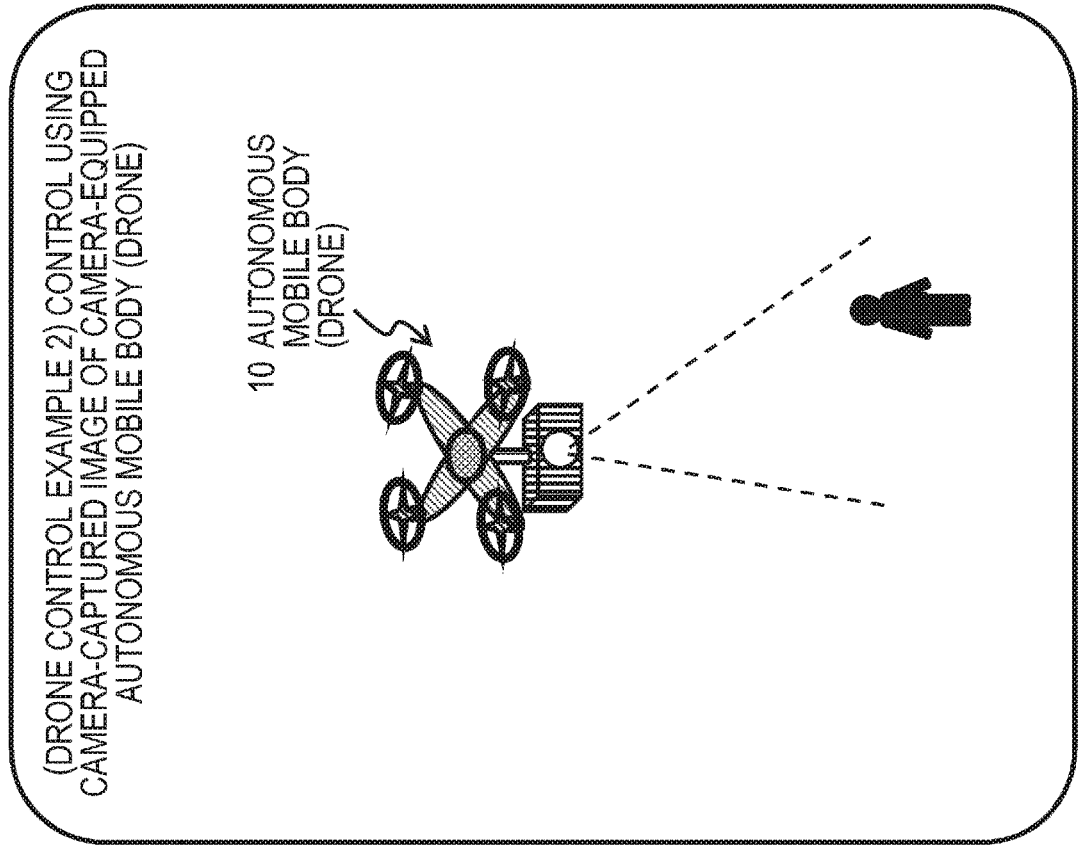
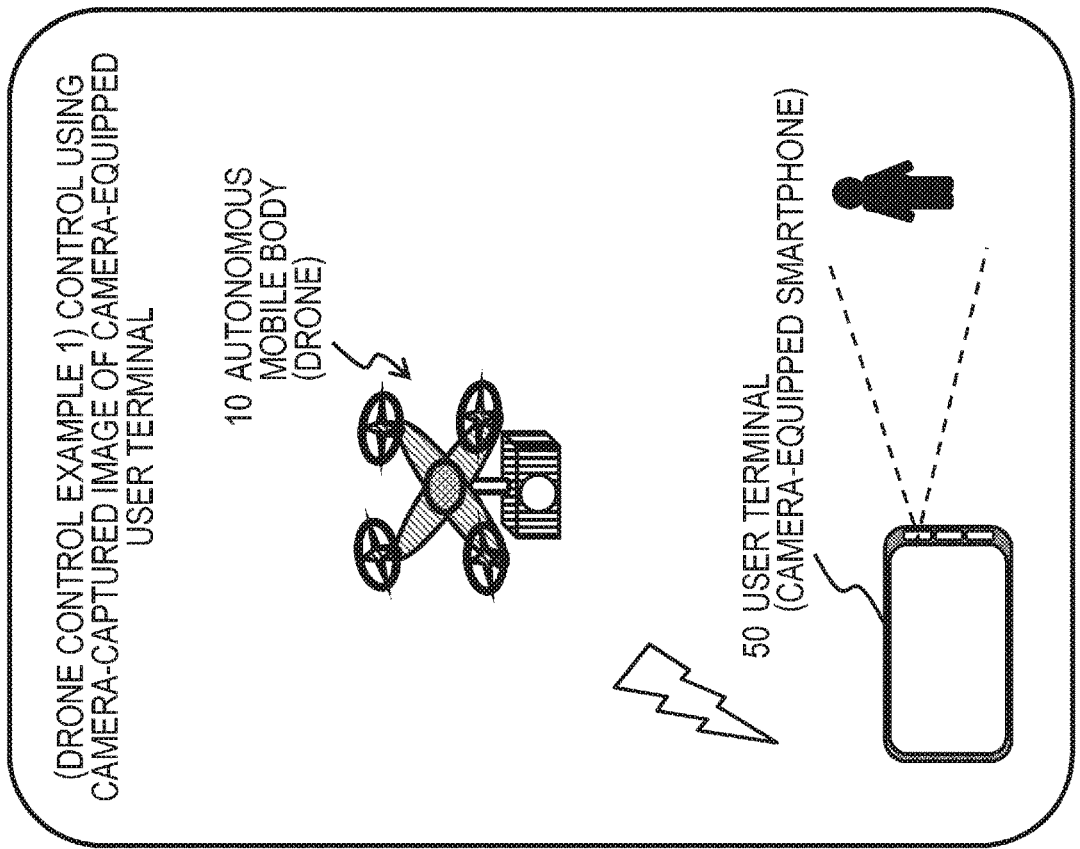

FIG. 10
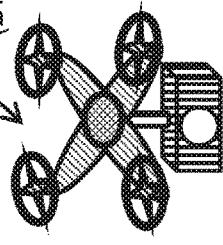
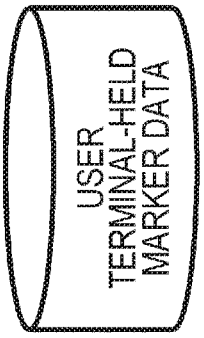
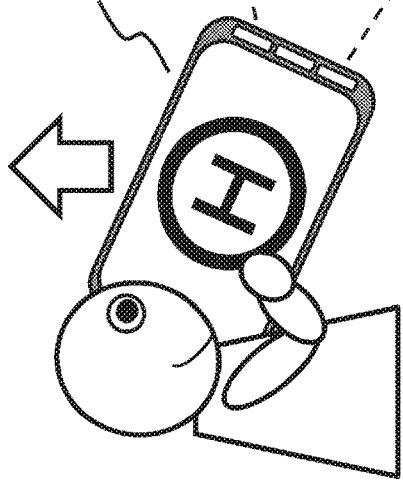

FIG. 17A TRANSFORMATION MATRIX BETWEEN MARKER REFERENCE COORDINATE SYSTEM (Marker) AND AUTONOMOUS MOBILE BODY SLAM COORDINATE SYSTEM (SLAMDrone) ($_{SLAM_{Drone}}^{Marker}T$) FIG. 17B

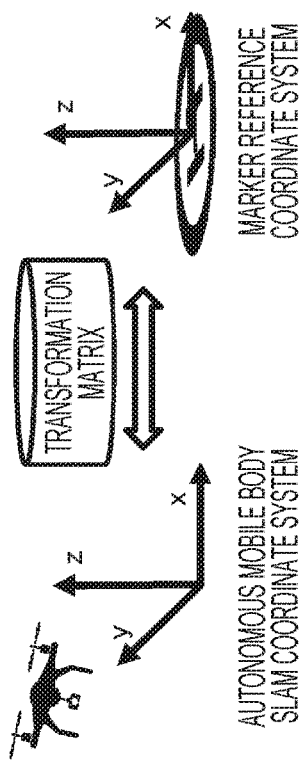

MARKER REFERENCE COORDINATE SYSTEM

TRANSFORMATION MATRIX

AUTONOMOUS MOBILE BODY SLAM COORDINATE SYSTEM

NOTATION OF COORDINATE SYSTEM.

FOLLOWING IS 4×4 MATRIX REPRESENTING TRANSFORMATION MATRIX FROM BASE COORDINATE SYSTEM TO OBJ COORDINATE SYSTEM. UPPER LEFT 3×3 IS ROTATION MATRIX, AND RIGHT 3×1 IS TRANSLATION VECTOR.

$$_{OBJ}^{BASE}T = \begin{bmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{bmatrix}$$

FIG. 17C $_{Drone}^{Marker}T = _{Camera_{Drone}(n)}^{Marker}T$ — TRANSFORMATION MATRIX BETWEEN FRAME(n) MARKER REFERENCE COORDINATE SYSTEM AND AUTONOMOUS MOBILE BODY CAMERA COORDINATE SYSTEM $_{SLAM_{Drone}}^{Marker}T = _{Drone}^{Marker}T * _{SLAM_{Drone}}^{Camera_{Drone}}T$ ... (FORMULA A1)

— TRANSFORMATION MATRIX BETWEEN MARKER REFERENCE COORDINATE SYSTEM AND AUTONOMOUS MOBILE BODY SLAM COORDINATE SYSTEM $_{SLAM_{Drone}}^{Marker}T = _{Camera_{Drone}(n)}^{Marker}T * _{SLAM_{Drone}}^{Camera_{Drone}}T$ ... (FORMULA A2)

— TRANSFORMATION MATRIX BETWEEN FRAME(n) AUTONOMOUS MOBILE BODY CAMERA COORDINATE SYSTEM AND AUTONOMOUS MOBILE BODY SLAM COORDINATE SYSTEM

— TRANSFORMATION MATRIX BETWEEN AUTONOMOUS MOBILE BODY SLAM COORDINATE SYSTEM AND AUTONOMOUS MOBILE BODY CAMERA COORDINATE SYSTEM (ESTIMATED BY SLAM)

— TRANSFORMATION MATRIX BETWEEN AUTONOMOUS MOBILE BODY CAMERA COORDINATE SYSTEM AND AUTONOMOUS MOBILE BODY COORDINATE SYSTEM (ESTIMATED BY DESIGN VALUE OR CALIBRATION)

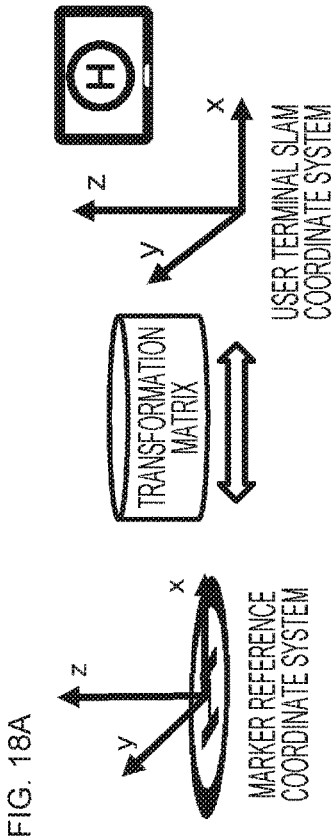

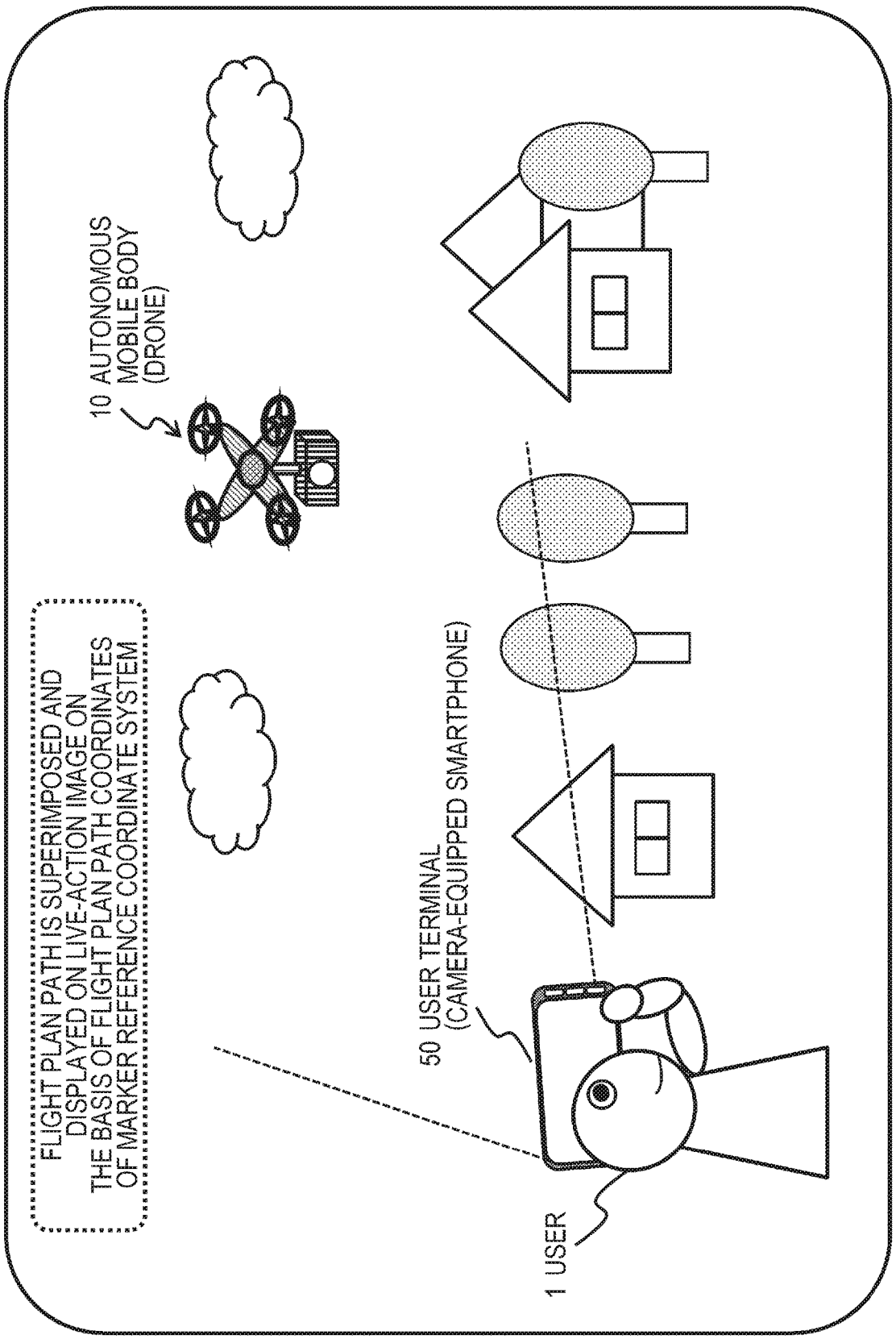

FIG. 23A

VECTOR REPRESENTING DESTINATION IN MARKER REFERENCE COORDINATE SYSTEM ($^{Marker}_{Dest}P$)

VECTOR REPRESENTING POSITION TO POINT X IN BASE COORDINATE SYSTEM $$^{BASE}_{X}T = \begin{bmatrix} t_x \\ t_y \\ t_z \\ 1 \end{bmatrix}$$

FIG. 23B

$$^{Marker}_{Dest}P = {}^{Marker}_{Camera_{Mobile}}T * {}^{Camera_{Mobile}}_{Dest}P \quad \cdots \text{(FORMULA C)}$$

TRANSFORMATION MATRIX OF MARKER REFERENCE COORDINATE SYSTEM AND USER TERMINAL CAMERA

VECTOR REPRESENTING POSITION OF POINT OF DESTINATION (Dest) IN USER TERMINAL CAMERA COORDINATE SYSTEM (TRANSFORM 2D POINT ON IMAGE COORDINATES INTO 3D POINT BY STEREO DISTANCE MEASUREMENT OR DISTANCE SENSOR)

FIG. 24

USER TERMINAL ACQUIRES 2D POINT ON IMAGE OF TRACKING TARGET, CALCULATES DISTANCE OF TRACKING TARGET USING DEPTH MAP, AND CALCULATES THREE-DIMENSIONAL POSITION OF TRACKING TARGET X IN USER TERMINAL CAMERA COORDINATES.
FURTHERMORE, CALCULATED THREE-DIMENSIONAL POSITION OF TRACKING TARGET X IS TRANSFORMED INTO THREE-DIMENSIONAL POSITION DATA OF MARKER REFERENCE COORDINATE SYSTEM AND TRANSMITTED TO AUTONOMOUS MOBILE BODY (DRONE).

TRACKING TARGET X IN USER TERMINAL CAMERA CAPTURED-IMAGE

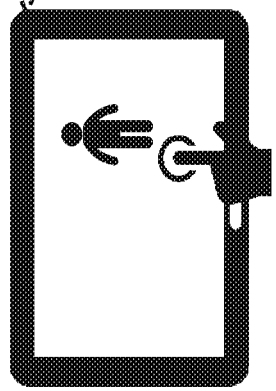

50 USER TERMINAL (CAMERA-EQUIPPED SMARTPHONE)

THREE-DIMENSIONAL POSITION OF TRACKING TARGET X IN MARKER REFERENCE COORDINATE SYSTEM

10 AUTONOMOUS MOBILE BODY (DRONE)

INFORMATION PROCESSING DEVICE, MOBILE DEVICE, INFORMATION PROCESSING SYSTEM, AND METHOD

CROSS REFERENCE TO RELATED APPLICATIONS

This application is a U.S. National Phase of International Patent Application No. PCT/JP2020/043960 filed on Nov. 26, 2020, which claims priority benefit of Japanese Patent Application No. JP 2020-099835 filed in the Japan Patent Office on Jun. 9, 2020. Each of the above-referenced applications is hereby incorporated herein by reference in its entirety.

TECHNICAL FIELD

The present disclosure relates to an information processing device, a mobile device, an information processing system, a method, and a program. More specifically, the present disclosure relates to an information processing device, a mobile device, an information processing system, a method, and a program capable of tracking a flight path and a destination of a mobile device such as a drone, for example, and a target to be followed with high accuracy.

BACKGROUND ART

In recent years, use of autonomous mobile bodies such as drones, automated cars, and cleaning robots has increased.

For example, the drone is used for processing of mounting a camera on the drone and imaging a landscape on the ground from above, and the like. Furthermore, use of a drone for delivery of baggage is also planned, and various experiments have been conducted.

At present, in many countries, it is required to control the flight of a drone by operating a controller under human monitoring, that is, in a range visible to a human. However, in the future, it is assumed that many autonomous flying drones that do not require visual monitoring by a person, that is, drones that autonomously fly from a departure point to a destination are used.

Such an autonomous flying drone flies from a departure point to a destination using, for example, communication information with a control center or GPS position information.

As a specific use form of the autonomous flying drone, there is baggage delivery by the drone. In a case where the baggage delivery is performed by the drone, when the scheduled arrival time of the drone carrying the baggage addressed to the user approaches, it is expected that the user who has requested the baggage delivery wants to look up the sky and check the drone carrying the baggage addressed to the user and check the flight path and the scheduled flight path.

In addition, even in the case of a drone other than the baggage delivery, for example, it is expected that there will be a demand for checking the flight path of the drone flying in the sky for safety confirmation.

As processing for realizing such a user request, for example, processing is conceivable in which an image of a drone in the sky is captured by a camera of a camera-equipped user terminal such as a smart phone, the captured image is displayed on a display unit, and a flight path or a scheduled flight path of the drone is superimposed and displayed on a live-action image of the drone.

That is, an augmented reality (AR) image in which a line indicating a flight path is superimposed on a real image of a drone is generated and displayed.

Information regarding a flight path and a scheduled flight path of the drone can be transmitted from the drone or a control center that manages the flight of the drone to a user terminal such as a smartphone by communication via a communication network.

The drone or the control center holds information regarding a flight path and a scheduled flight path of the drone, that is, flight path information, and can provide the flight path information to a user terminal such as a smartphone.

However, many drones perform position control using communication information of GPS satellites. The position information obtained from the GPS satellites is latitude information, longitude information, and height information. Many drones perform position confirmation and flight control according to the NED coordinate system in order to fly using these pieces of information.

The NED coordinate system is a coordinate system in which north, east, and down are set as three axes.

The drone or the control center holds flight path information that is information regarding a flight path or a scheduled flight path of the drone as path information (N, E, D) to which the NED coordinates are applied, and path information according to the NED coordinate system is provided to a user terminal such as a smartphone.

On the other hand, the camera-captured image displayed on the user terminal such as the smartphone is image data according to the camera coordinate system set according to the imaging direction of the camera.

The image position of the real image of the drone captured by the camera of the user terminal such as the smartphone can be specified as the image position on the camera coordinates. However, it is difficult to calculate which position in the NED coordinates the actual image position of the drone corresponds to.

As described above, the position of the drone that is the real image displayed on the user terminal such as the smartphone is a position that can be specified in the camera coordinate system, but the flight path information of the drone received from the drone or the control center is path position information specified in the NED coordinate system, and there is a problem that it is difficult to check to which position of the camera coordinates the path position corresponds.

As a result, even if the user terminal such as the smartphone receives the flight path information of the drone from the drone or the control center and attempts to display the flight path on the display unit on the basis of the received information, there occurs a problem that an accurate path cannot be displayed.

Note that, for example, there is Patent Document 1 (Japanese Patent No. 5192598) as a conventional technique that discloses a configuration in which AR display of the position and trajectory of a self-traveling robot is performed on a captured image of a fixed point camera such as a monitoring camera.

This configuration discloses a configuration in which an AR tag is installed in a self-traveling robot or a work area of the self-traveling robot, the AR tag is recognized from a camera-captured image, and a position and a path of the self-traveling robot can be identified by generating one piece of reference coordinate information and using the generated reference coordinate information.

However, this configuration requires attaching the AR tag within the work area and is only applicable within a limited work area. In a configuration that flies in the sky like a drone, it is impossible to attach an AR tag in the sky.

In addition to the drone, there is a problem that it is difficult for a user to grasp where an autonomous mobile body such as a drone, an automated car, or a cleaning robot is going to move by linking with the real world.

Furthermore, there is also a problem that fine adjustment such as setting and changing a destination of the autonomous mobile body is difficult. In addition, in a case where an autonomous mobile body such as a drone tracks a person, a car, or the like, in order to change the tracking target, it is necessary to recognize the change target with a tracking camera of the autonomous mobile body, and there is also a problem that it takes time and effort.

CITATION LIST

Patent Document

Patent Document 1: Japanese Patent No. 5192598

SUMMARY OF THE INVENTION

Problems to be Solved by the Invention

The present disclosure has been made in view of the above problems, for example, and makes it possible to display a real image of a drone, which is a camera-captured image, on a user terminal such as a smartphone, for example, and to accurately superimpose and display a flight path and a scheduled flight path of the drone together with the real image. Furthermore, another object of the present invention is to provide an information processing device, a mobile device, an information processing system, a method, and a program capable of tracking a flight path and a destination of a mobile device such as a drone, and a target to be followed with high accuracy.

Solutions to Problems

A first aspect of the present disclosure is
an information processing method executed in an information processing device, the information processing method including:
setting, by a data processing unit, a real object included in a camera-captured image of the information processing device as a marker, and generating marker reference coordinates with a configuration point of the set marker as an origin; and
transmitting, by the data processing unit, position data on the marker reference coordinates to another device by using the marker reference coordinates as coordinates shared with the another device.

Moreover, a second aspect of the present disclosure is
an information processing device including:
a camera that captures an image; and
a data processing unit that sets a real object included in the camera-captured image as a marker, generates marker reference coordinates with a configuration point of the set marker as an origin, and
that transmits position data on the marker reference coordinates to another device by using the marker reference coordinates as coordinates shared with the another device.

Further, a third aspect of the present disclosure is
a mobile device including:
a data processing unit that executes movement control of a mobile device; and
a camera that captures an image,
in which the data processing unit
detects a predetermined marker from a real object included in the captured image of the camera, and analyzes a position of the real object included in the captured image of the camera by using marker reference coordinates with a configuration point of the detected marker as an origin.

Further, a fourth aspect of the present disclosure is
an information processing system including a mobile device and a user terminal,
in which the mobile device stores, in a storage unit,
marker data including feature point information of a marker that is a real object that can be imaged by a camera of the mobile device and marker reference coordinate information with a configuration point of the marker as an origin, and
a coordinate transformation matrix to be applied to transformation of position data of mobile device camera coordinates, which is a coordinate system unique to the camera of the mobile device, and position data of the marker reference coordinates,
the user terminal stores, in a storage unit,
marker data including feature point information of a marker that is a real object that can be imaged by a camera of the user terminal and marker reference coordinate information with a configuration point of the marker as an origin, and
a coordinate transformation matrix to be applied to transformation of position data of user terminal camera coordinates, which is a coordinate system unique to the camera of the user terminal, and position data of the marker reference coordinates, and
the mobile device and the user terminal
transmit and receive a position of an object included in a camera-captured image of each device or movement path information of the mobile device as position information on the marker reference coordinates.

Further, a fifth aspect of the present disclosure is
a program for causing an information processing device to execute information processing, the program causing
a data processing unit to execute processing of:
setting a real object included in a camera-captured image of the information processing device as a marker, and generating marker reference coordinates with a configuration point of the set marker as an origin; and
transmitting position data on the marker reference coordinates to another device by using the marker reference coordinates as coordinates shared with the another device.

Note that the program of the present disclosure is, for example, a program that can be provided by a storage medium or a communication medium provided in a computer readable format to an information processing device or a computer system capable of executing various program codes. By providing such a program in a computer-readable format, processing according to the program is realized on the information processing device or the computer system.

Still other objects, features, and advantages of the present disclosure will become apparent from more detailed description based on examples of the present disclosure described later and the accompanying drawings. Note that, in the present specification, a system is a logical set configuration of a plurality of devices, and is not limited to a system in which devices of respective configurations are in the same housing.

According to a configuration of an embodiment of the present disclosure, a configuration enabling processing or the like of displaying a flight path of a drone on a live-action image of the drone is realized.

Specifically, for example, a data processing unit of a user terminal sets a real object included in a camera-captured image as a marker, generates marker reference coordinates with a configuration point of the set marker as an origin, and transmits position data on the marker reference coordinates to a mobile device such as a drone by using the marker reference coordinates as coordinates shared with another device, for example, a mobile device such as a drone. For example, the data processing unit transforms the destination position of the drone or the position of the tracking target from the coordinate position on the user terminal camera coordinates to the coordinate position on the marker reference coordinates by applying the coordinate transformation matrix, and transmits the transformed coordinate position to the drone. In addition, the data processing unit receives the movement path from the drone as coordinate position data on the marker reference coordinates, transforms the coordinate position data into a coordinate position on the user terminal camera coordinates by applying the coordinate transformation matrix, and displays the path information on the display unit.

With this configuration, a configuration enabling processing of displaying the flight path of the drone on the live-action image of the drone or the like is realized.

Note that the effects described in the present specification are merely examples and are not limited, and additional effects may be provided.

BRIEF DESCRIPTION OF DRAWINGS

FIG. 8 is a diagram illustrating a processing example to which the configuration of the present disclosure is applied.

FIG. 10 is a diagram illustrating generation of marker data and recording processing.

FIGS. 17A, 17B, and 17C are diagrams illustrating a specific calculation processing example of a transformation matrix of two coordinate systems of a marker standard coordinate system and an autonomous mobile body SLAM coordinate system.

FIGS. 18A, 18B, and 18C are diagrams illustrating a specific calculation processing example of a transformation matrix of two coordinate systems of a marker standard coordinate system and a user terminal SLAM coordinate system.

FIG. 19 is a diagram illustrating a processing example to which the configuration of the present disclosure is applied.

FIGS. 23A and 23B are diagrams illustrating a specific example of calculation processing of a vector indicating a destination position in a marker reference coordinate system.

FIG. 24 is a diagram illustrating a processing example to which the configuration of the present disclosure is applied.

MODE FOR CARRYING OUT THE INVENTION

Figure 1B:
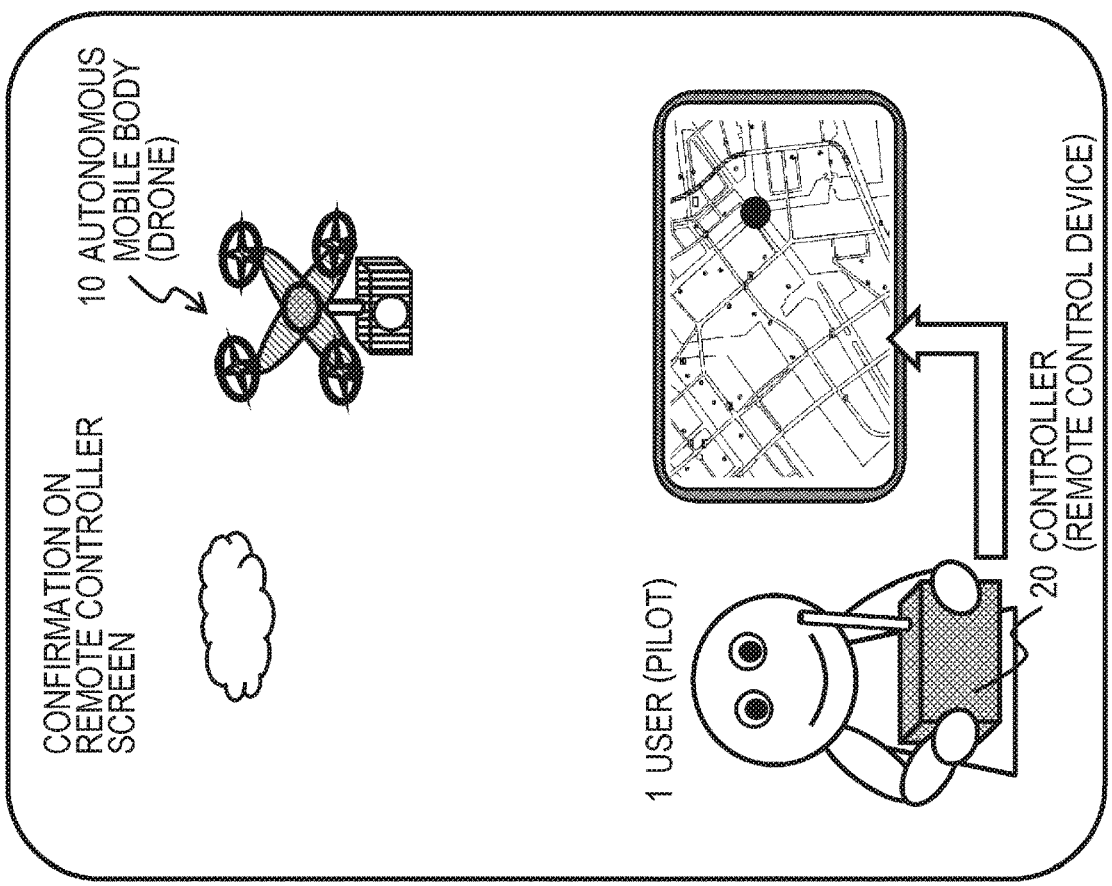
FIGS. 1A and 1B are views illustrating a path confirmation processing example of a general autonomous mobile body.

Hereinafter, details of an information processing device, a mobile device, an information processing system, a method, and a program of the present disclosure will be described with reference to the drawings. Note that the description will be made according to the following items.
1. Path confirmation processing example of drone
2. Outline of processing executed by information processing device of present disclosure
3. Marker reference coordinate and marker data
4. Pre-preparation processing executed by each device
5. Specific example of processing executable after pre-preparation processing 6. Sequence of processing executed by information processing device of present disclosure
  6-(1) Sequence of processing of generation of marker data and transformation matrix and storage in storage unit
  6-(2) Marker confirmation processing sequence
  6-(3) Self-position/posture calculation processing sequence according to marker reference coordinates
  6-(4) Landing sequence of autonomous mobile body (drone) to destination
  6-(5) Tracking sequence of tracking target imaged in captured image of drone camera of autonomous mobile body (drone)
  6-(6) Tracking sequence of tracking target imaged in captured image of user terminal camera of user terminal
7. Configuration example of information processing device of present disclosure
8. Summary of configuration of present disclosure

[1. Path confirmation processing example of autonomous mobile body]

First, a path confirmation processing example of a general autonomous mobile body will be described with reference to FIGS. 1A and 1B.

Note that an example in which a drone is used as an example of the autonomous mobile body will be described below. However, the autonomous mobile body of the present disclosure is not limited to a drone, and includes various mobile bodies such as an automatic traveling robot and an automated vehicle.

As described above, current drones are required to perform flight control by operating a controller under human monitoring in many countries, that is, in a range visible to a human. However, in the future, it is assumed that an autonomous flying drone that does not require visual monitoring by a person, that is, a drone that autonomously flies from a departure point to a destination is used. Such an autonomous flying drone flies from a departure point to a destination using, for example, communication information with a control center or GPS position information.

As a specific use form of the autonomous flying drone, there is baggage delivery by the drone. In a case where the baggage delivery is performed by the drone, when the scheduled arrival time of the drone carrying the baggage addressed to the user approaches, it is expected that the user who has requested the baggage delivery wants to look up the sky and check the drone carrying the baggage addressed to the user and check the flight path and the scheduled flight path.

There is also a case where it is desired to, for example, designate or change the scheduled landing position.

A flight path confirmation processing example of a general drone will be described with reference to FIGS. 1A and 1B.

Figure 1A:
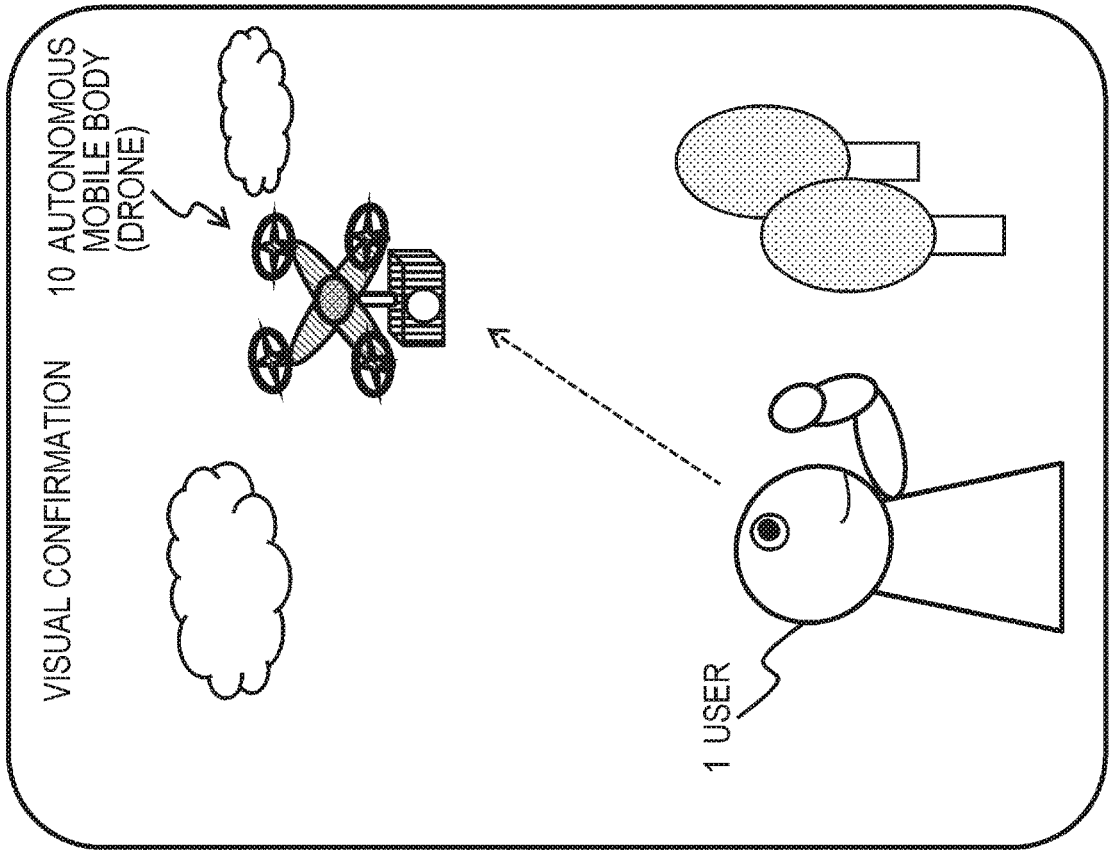

FIG. 1A illustrates an example of visual confirmation. A user 1 visually confirms an autonomous flying body (drone) 10 flying in the sky.

In this way, it is possible to roughly confirm the movement path (flight path) of the autonomous flying body (drone) 10 by visual confirmation.

FIG. 1B illustrates a configuration in which a current position and a movement path (flight path) of an autonomous flying body (drone) 10 are displayed on a screen of a controller (remote control device) 20 possessed by a user (pilot) 1.

With such a configuration, the current position and the movement path (flight path) of the autonomous flying body (drone) 10 can be displayed and confirmed on a map displayed on a screen of the controller (remote control device) 20.

However, the display information on the screen of the controller (remote control device) 20 is display information indicating the current position of the autonomous flying body (drone) 10 by dots on a map generated in advance using the map, and the accuracy is not so high. For example, in a case where the map is enlarged, a problem that the current position of the autonomous flying body (drone) 10 cannot be displayed with high accuracy easily occurs.

[2. Outline of Processing Executed by Information Processing Device of Present Disclosure]

Next, an outline of processing executed by the information processing device of the present disclosure will be described with reference to FIG. 2 and subsequent drawings.

Figure 2:
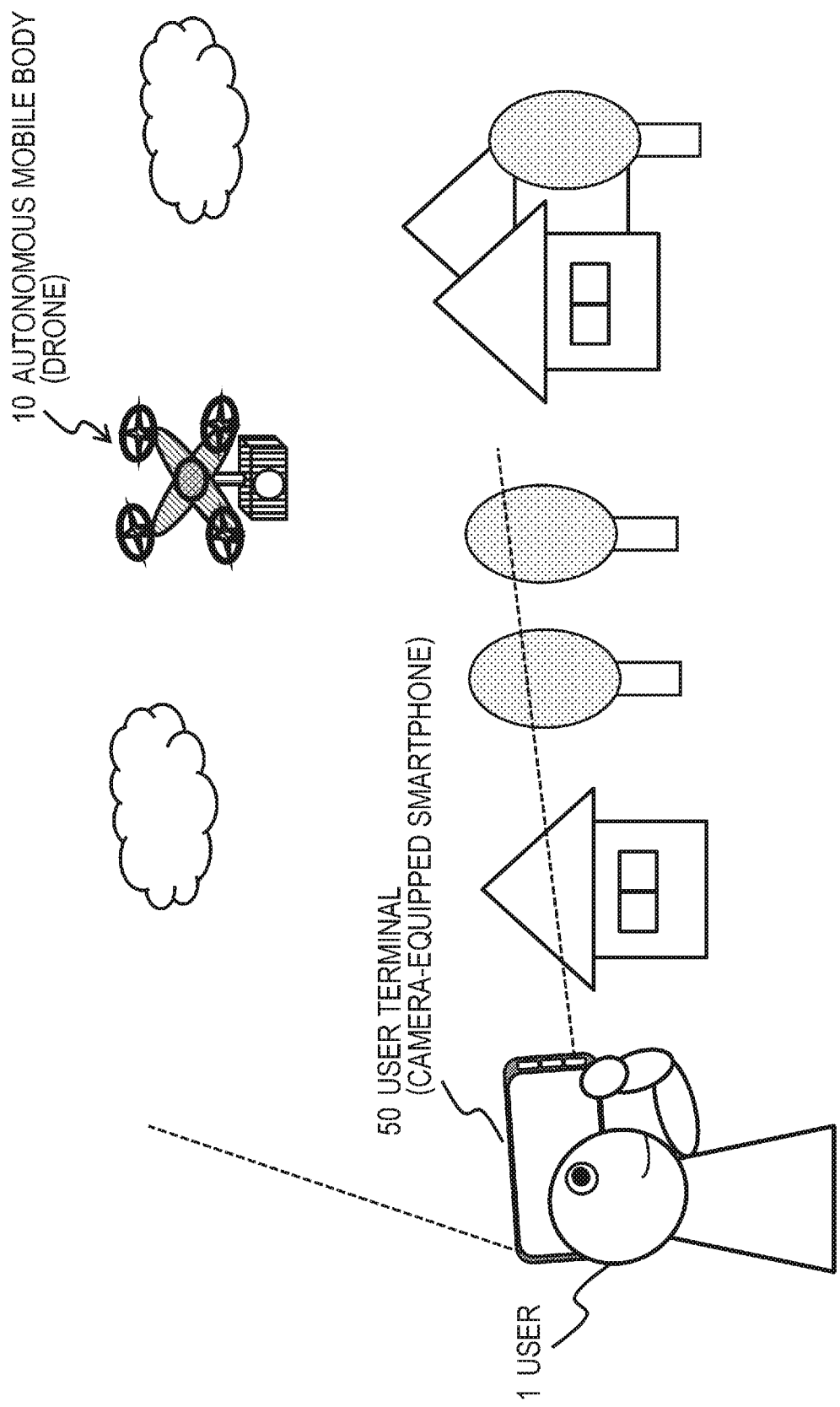
FIG. 2 is a diagram illustrating an outline of processing executed by an information processing device of the present disclosure.

FIG. 2 illustrates an autonomous mobile body (drone) 10 flying in the sky and a user 1 having a user terminal 50 such as a camera-equipped smart phone (smart phone).

The user 1 directs the camera of the user terminal 50 toward the autonomous mobile body (drone) 10 in the sky, and captures an image of the autonomous mobile body (drone) 10.

Figure 3:
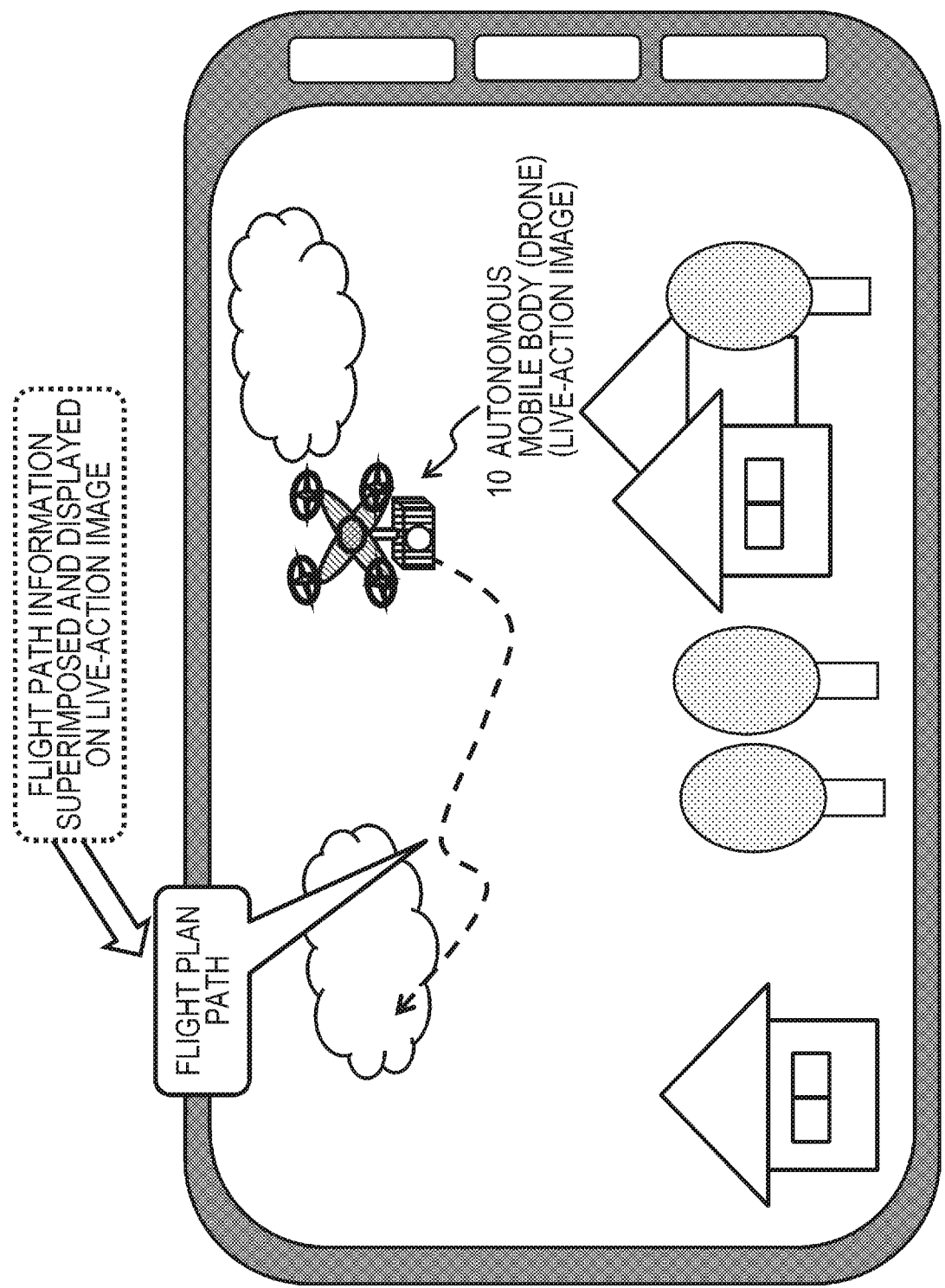
FIG. 3 is a diagram illustrating a specific example of processing of displaying route information of a drone on a display unit of a user terminal.

FIG. 3 illustrates an example of a display image of the user terminal 50.

The image illustrated in FIG. 3 is an image captured by a camera of the user terminal 50, and an autonomous mobile body (drone) 10 is displayed. The image of the autonomous mobile body (drone) 10 is a real object actually flying in the sky.

In this real image, a line indicating a flight plan path of the autonomous mobile body (drone) 10 is displayed as a virtual image generated by the data processing unit of the user terminal 50.

That is, an augmented reality (AR) image in which a virtual line indicating a flight path is superimposed on a real image of the drone is generated and displayed.

A "flight plan path" illustrated in FIG. 3 is a scheduled flight path from the current position of the autonomous mobile body (drone) 10.

In this example, the start point of the "flight plan path" illustrated in the figure coincides with the current position of the autonomous mobile body (drone) 10, and the path information is accurately displayed.

For example, the autonomous mobile body (drone) 10 performs processing of flying from the current position according to a "flight plan path", landing in front of a house, and delivering a baggage addressed to the user.

Note that the user terminal 50 is not limited to a camera-equipped smart phone, and can be realized as various portable terminals or wearable terminals.

Figure 4:
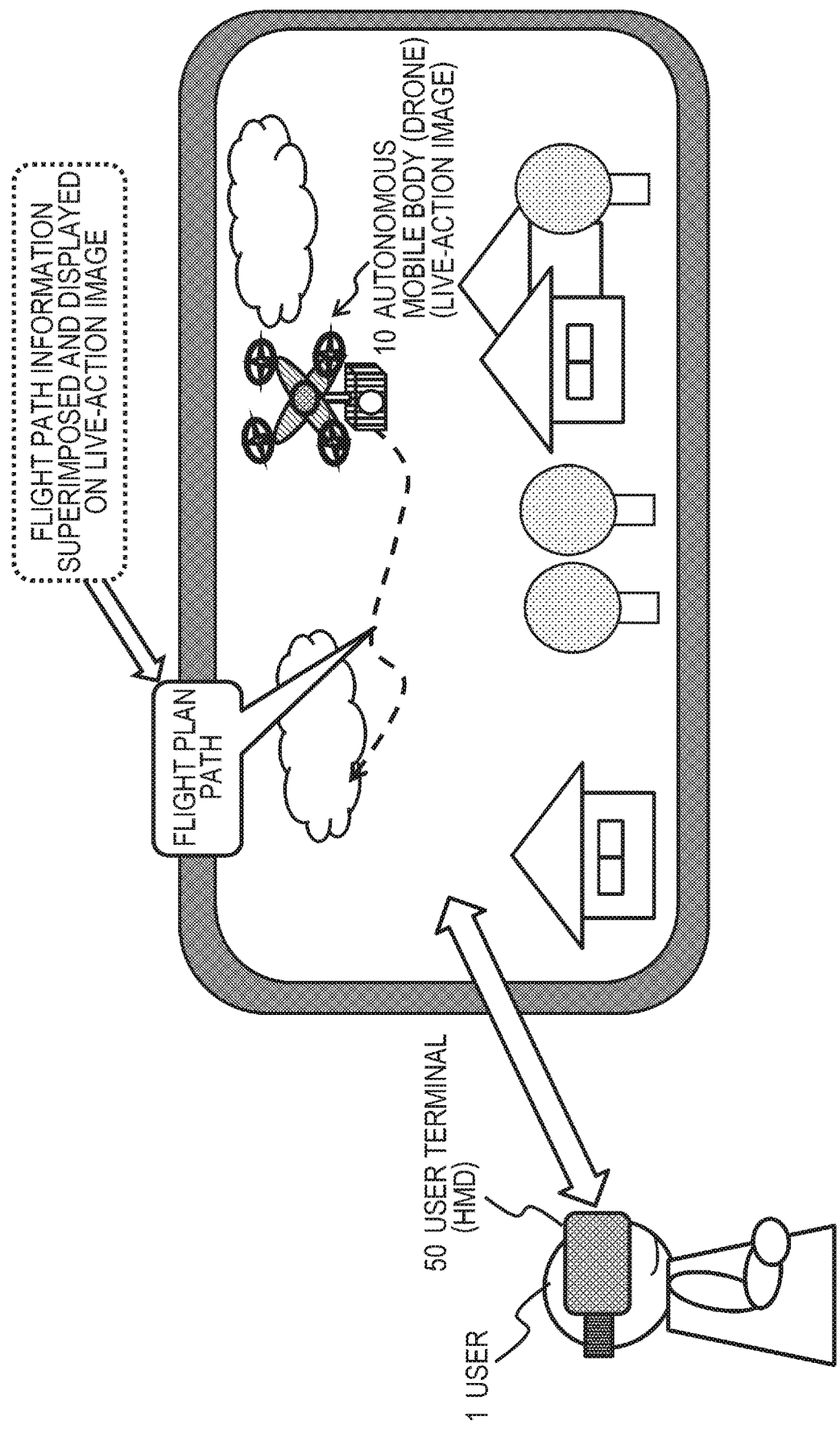
FIG. 4 is a diagram illustrating a specific example of processing of displaying route information of a drone on a display unit of a user terminal.

For example, as illustrated in FIG. 4, a head mount display (HMD) may be used.

The head mount display (HMD) illustrated in FIG. 4 also generates and displays an augmented reality (AR) image in which a virtual line indicating a flight path is superimposed on a real image of the drone captured by the camera.

Figure 5:
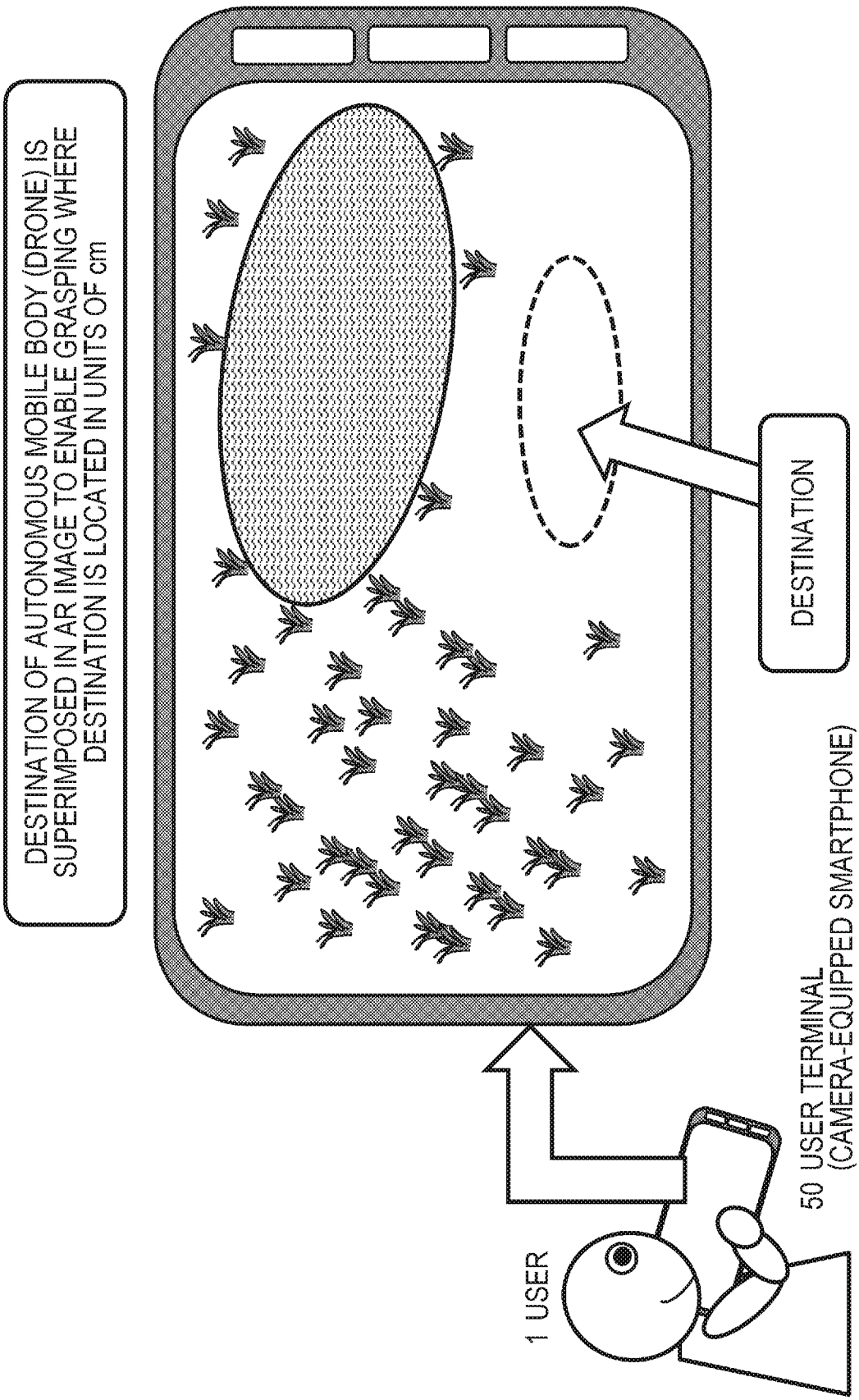
FIG. 5 is a diagram illustrating a processing example to which the configuration of the present disclosure is applied.

FIG. 5 is a diagram illustrating another specific processing example using the processing of the present disclosure.

The user 1 touches a display unit (touch display) of the user terminal 50 to set a destination which is a landing position of the autonomous mobile body (drone) 10.

A real image captured by the camera of the user terminal 50 is displayed on the display unit of the user terminal 50, and the user 1 sets a destination on the real image.

Position information of a destination that is a landing position of the autonomous mobile body (drone) 10 input to the user terminal 50 is transmitted to the autonomous mobile body (drone) 10 or a control center (control unit) of the autonomous mobile body (drone) 10, and the autonomous mobile body (drone) 10 determines a flight path to the destination set by the user 1, flies toward the destination, and lands at the destination.

However, the three-dimensional position of the destination set on the display unit of the user terminal 50 is a three-dimensional position prescribed by the camera coordinate system of the user terminal 50, and even if three-dimensional position information defined by the camera coordinate system of the user terminal 50 is transmitted to the autonomous mobile body (drone) 10 or the control center (control unit) of the autonomous mobile body (drone) 10, the autonomous mobile body (drone) 10 or the control center (control unit) cannot accurately grasp the actual position of the destination.

Therefore, the information processing device of the present disclosure, for example, the user terminal 50 transforms the three-dimensional position information prescribed by the camera coordinate system of the user terminal 50 into three-dimensional position information of another coordinate system (marker reference coordinate system), and transmits the three-dimensional position information of the destination expressed by the marker reference coordinate system to the autonomous mobile body (drone) 10 or the control center (control unit) of the autonomous mobile body (drone) 10.

The autonomous mobile body (drone) 10 and the control center (control unit) can accurately grasp the position of the destination set by the user 1 on the basis of the three-dimensional position information of the destination expressed by the marker reference coordinate system, determine the flight path to the destination, fly toward the destination, and land at the destination.

Specific examples of the marker reference coordinate system and the coordinate transformation processing will be described in detail later.

Figure 6:
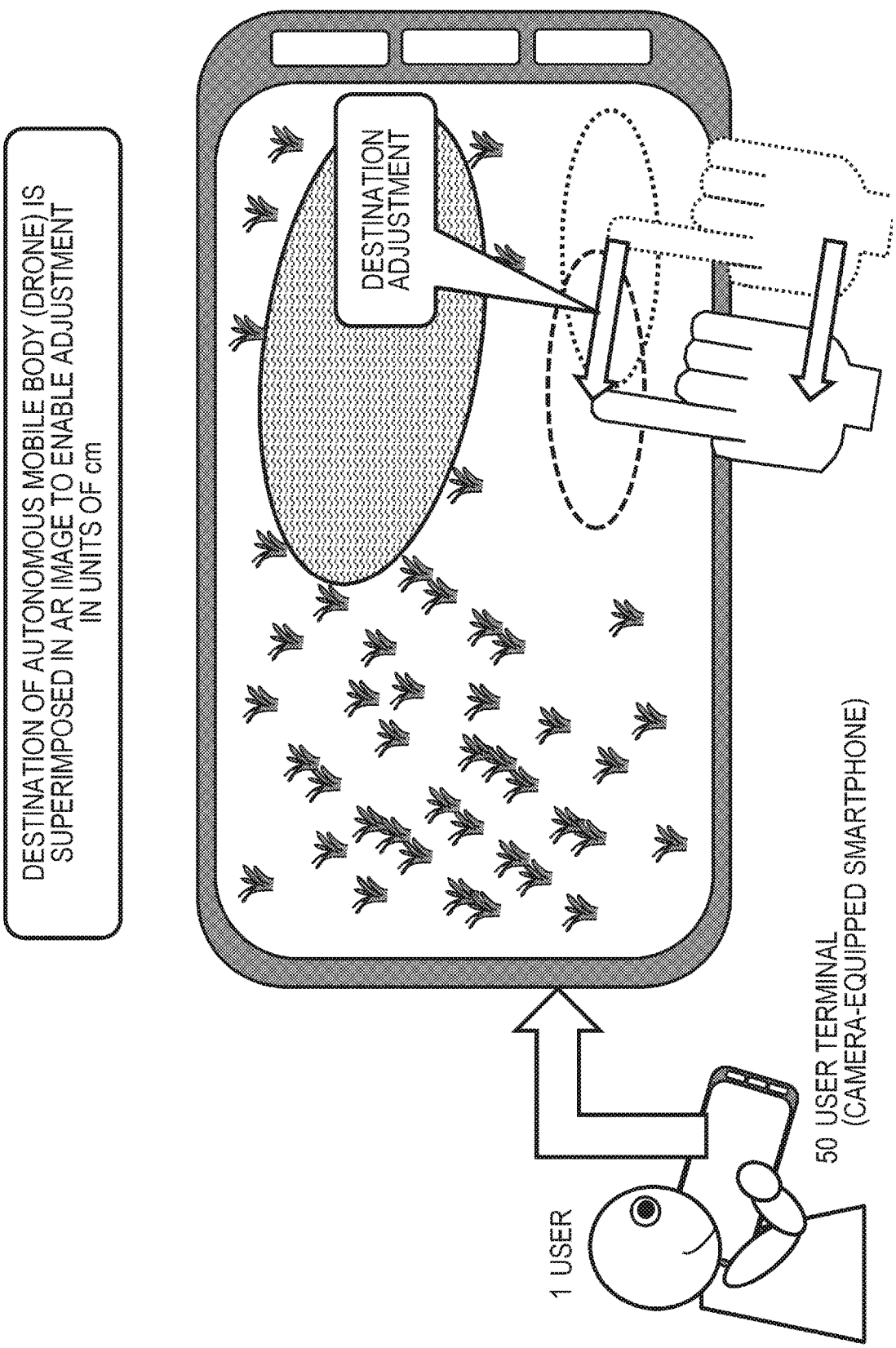
FIG. 6 is a diagram illustrating a processing example to which the configuration of the present disclosure is applied.

Furthermore, as illustrated in FIG. 6, there is a case where the user 1 sets a destination on a real image captured by the camera of the user terminal 50 and then performs processing of changing the destination.

Similarly, regarding the three-dimensional position of the new destination after this change, the user terminal 50 transforms three-dimensional position information prescribed by the camera coordinate system of the user terminal 50 into three-dimensional position information of another coordinate system (marker reference coordinate system), and transmits the three-dimensional position information of the destination expressed by the marker reference coordinate system to the autonomous mobile body (drone) 10 or the control center (control unit) of the autonomous mobile body (drone) 10.

The autonomous mobile body (drone) 10 and the control center (control unit) can accurately grasp the position of the new destination set by the user 1 on the basis of the three-dimensional position information of the changed destination expressed in the marker reference coordinate system, determine the flight path to the new destination, fly toward the new destination, and land at the new destination.

Figure 7:
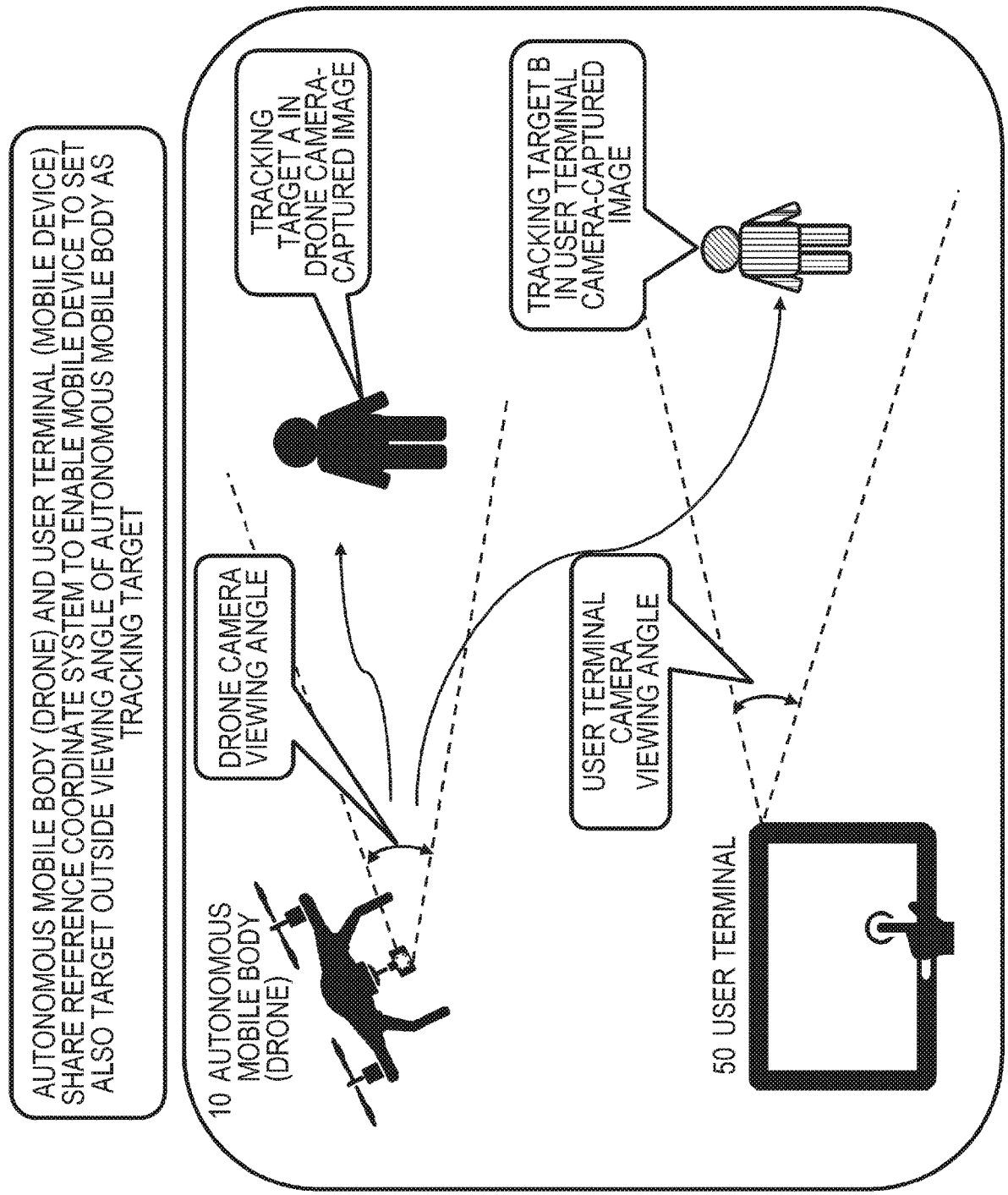
FIG. 7 is a diagram illustrating a processing example to which the configuration of the present disclosure is applied.

FIG. 7 is a diagram illustrating another specific example using the processing of the present disclosure.

The example illustrated in FIG. 7 is an example in which the autonomous mobile body (drone) 10 performs tracking processing on a specific tracking target.

In a case where the autonomous mobile body (drone) 10 performs tracking processing on a specific tracking target, the tracking target is normally imaged by a camera of the autonomous mobile body (drone) 10, and a flight toward the tracking target in the image is performed.

As in the example illustrated in the upper part of FIG. 7, an image is captured so that a tracking target A falls within the viewing angle of the drone camera that is the camera of the autonomous mobile body (drone) 10, and a flight toward the tracking target in the image is performed.

In a case where the tracking target is out of the viewing angle of the drone camera, which is the camera of the autonomous mobile body (drone) 10, tracking cannot be performed.

By applying the configuration and processing of the present disclosure, the tracking processing can be performed even in such a case.

As illustrated in the lower part of FIG. 7, in a case where a tracking target B is imaged by the camera of the user terminal 50, three-dimensional position information of the tracking target B is transmitted to the autonomous mobile body (drone) 10 or the control center (control unit) of the autonomous mobile body (drone) 10.

The user terminal 50 transforms the three-dimensional position information of the tracking target B prescribed by the camera coordinate system of the user terminal 50 into the three-dimensional position information of the marker reference coordinate system described above, and transmits the three-dimensional position information of the tracking target B expressed by the marker reference coordinate system to the autonomous mobile body (drone) 10 or the control center (control unit) of the autonomous mobile body (drone) 10.

The autonomous mobile body (drone) 10 and the control center (control unit) can accurately grasp the three-dimensional position of the tracking target B imaged by the camera of the user terminal 50 on the basis of the three-dimensional position information of the tracking target B expressed by the marker reference coordinate system, determine the flight path to the three-dimensional position of the tracking target B, fly toward the tracking target B, and track the tracking target B.

As described above, by applying the configuration and the processing of the present disclosure, the autonomous mobile body (drone) 10 can track the tracking target that is not within the viewing angle of the drone camera that is the camera of the autonomous mobile body (drone) 10.

Note that, as illustrated in FIG. 8, as for the movement control (flight control) of the autonomous mobile body (drone) 10, there is a case where the user terminal 50 performs the control as illustrated in FIG. 8 (drone control example 1), or a case where the autonomous mobile body (drone) 10 itself performs the control without using the user terminal 50 as illustrated in FIG. 8 (drone control example 2).

[3. Marker Reference Coordinates and Marker Data]

Next, the marker reference coordinates and the marker data will be described.

Figure 9:
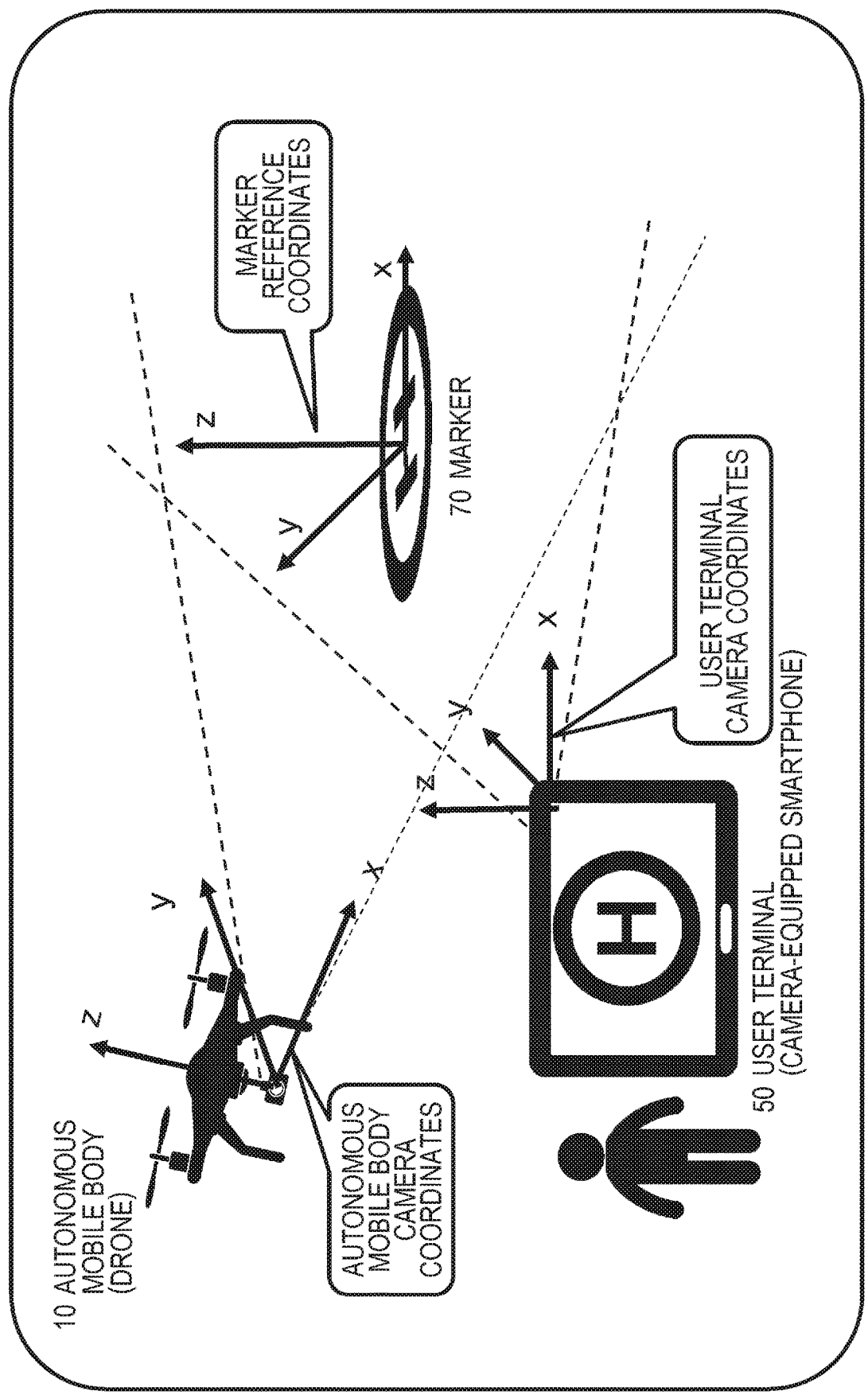
FIG. 9 is a diagram illustrating a plurality of coordinate systems used in the present disclosure.

FIG. 9 is a diagram illustrating three main coordinate systems used in the processing of the present disclosure. FIG. 9 illustrates the following three coordinate systems.

(1) Autonomous mobile body camera coordinate system
(2) User terminal camera coordinate system
(3) Marker reference coordinate system "(1) Autonomous mobile body camera coordinate system" is a coordinate system set on the basis of the position and posture of the camera of the autonomous mobile body (drone) 10.

For example, the coordinate system is a coordinate system in which a position of a camera of the autonomous mobile body (drone) 10 is set as an origin, a vertical direction of the camera is set as a z-axis direction, an imaging direction of the camera is set as a y-axis direction, and a horizontal direction of the camera is set as an x-axis direction.

"(2) User terminal camera coordinate system" is a coordinate system set on the basis of the position and posture of the camera of the user terminal 50.

For example, the coordinate system is a coordinate system in which a position of a camera of the autonomous mobile body (drone) 10 is set as an origin, a vertical direction of the camera is set as a z-axis direction, an imaging direction of the camera is set as a y-axis direction, and a horizontal direction of the camera is set as an x-axis direction.

"(3) Marker reference coordinate system" is a coordinate system set on the basis of the position and posture of the real object (real body) in the real world that can be imaged by the camera.

In the example illustrated in the drawing, a character region of "H" is illustrated as a marker used in the marker standard coordinate system. This is an example for illustrating the marker standard coordinate system in an easily understandable manner, and even without such a character region, for example, it is possible to set a part of a general landscape such as a lawn or a stone pavement on the ground of a park as a marker.

The "(3) marker reference coordinate system" is, for example, a coordinate system in which a center position of a real object in the real world that can be imaged by a camera is set as an origin, a vertical direction of the real object is set as a z-axis direction, and two orthogonal directions set on a plane of the real object are set as x-axis and y-axis directions.

As described above, in the processing of the present disclosure, these three coordinate systems, that is,
  (1) autonomous mobile body camera coordinate system
  (2) user terminal camera coordinate system
  (3) marker reference coordinate system,
  are used. Furthermore, in addition to these coordinate systems, a simultaneous localization and mapping (SLAM) coordinate system used by the autonomous mobile body (drone) 10 and the user terminal 50 to analyze the self-position and posture is also used even in a case where the marker cannot be imaged by the camera of the autonomous mobile body (drone) 10 or the user terminal 50.

The SLAM coordinate system will be described later.

As pre-preparation processing for realizing the processing described with reference to FIGS. 2 to 8, the autonomous mobile body (drone) 10 and the user terminal 50 perform processing of imaging a marker with each camera and storing marker data, which is analysis data of the imaged marker, in a storage unit of each device.

FIG. 10 is a diagram illustrating processing of imaging a marker 70 with the camera of the user terminal 50 and storing marker data that is analysis data of the imaged marker 70 in the storage unit of the user terminal 50. The storage unit of the user terminal 50 stores user terminal-held marker data 51 that is analysis data of the marker 70.

Figure 11:
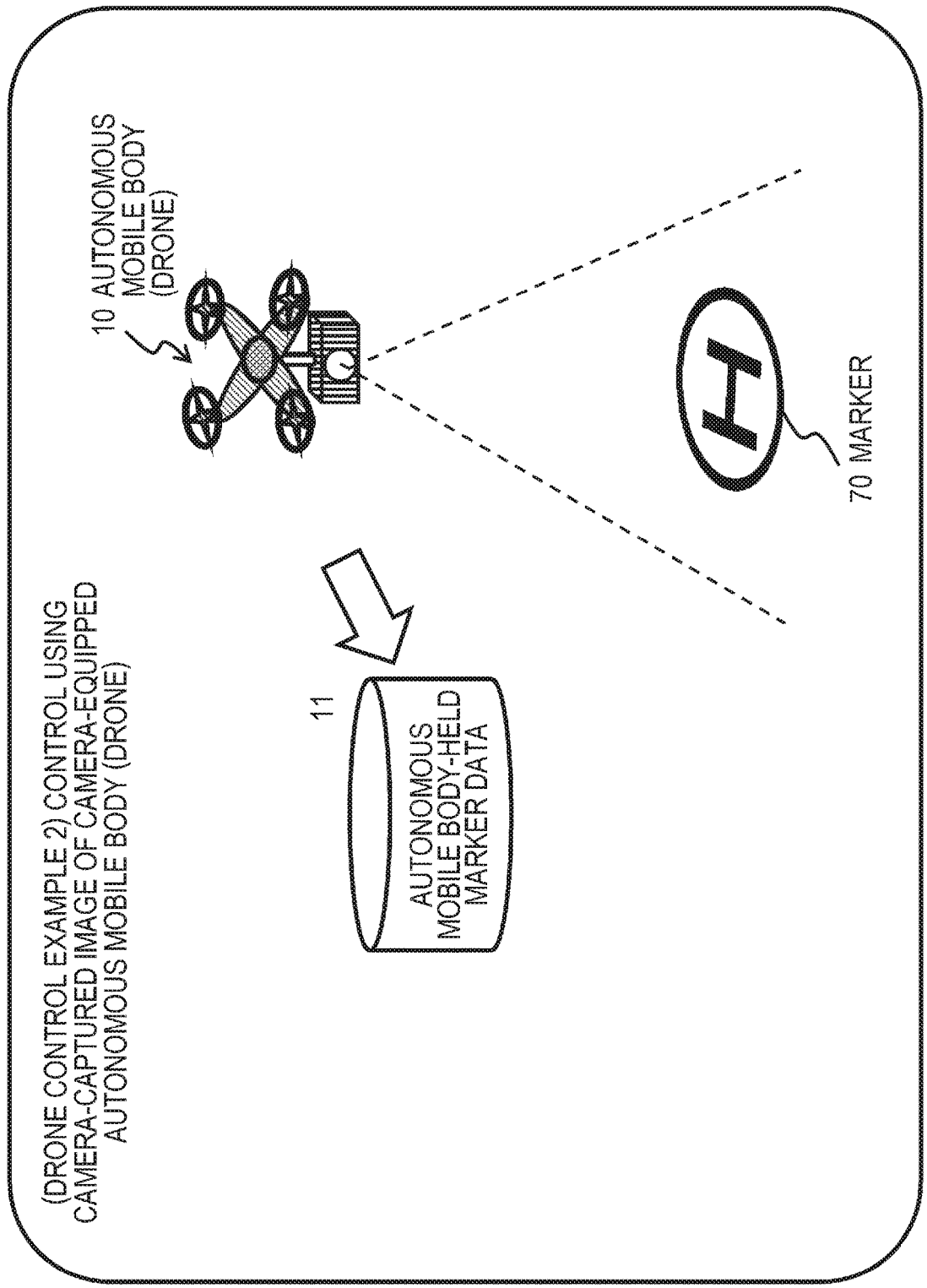
FIG. 11 is a diagram illustrating generation of marker data and recording processing.

FIG. 11 is a diagram illustrating processing of imaging the marker 70 with the camera of the autonomous mobile body (drone) 10 and storing marker data, which is analysis data of the imaged marker 70, in the storage unit of the autonomous mobile body (drone) 10. The storage unit of the autonomous mobile body (drone) 10 stores autonomous mobile body (drone) holding marker data 11 which is analysis data of the marker 70.

The markers imaged by the autonomous mobile body (drone) 10 and the user terminal 50 are the same real object existing in the real world.

Note that, in the example illustrated in FIG. 10, a character region of "H" is illustrated as a marker, but this is an example for illustrating the marker in an easy-to-understand manner. Even without such a character region, for example, it is possible to set a part of a general landscape such as a lawn or a stone pavement on the ground of a park as a marker.

Figure 12:
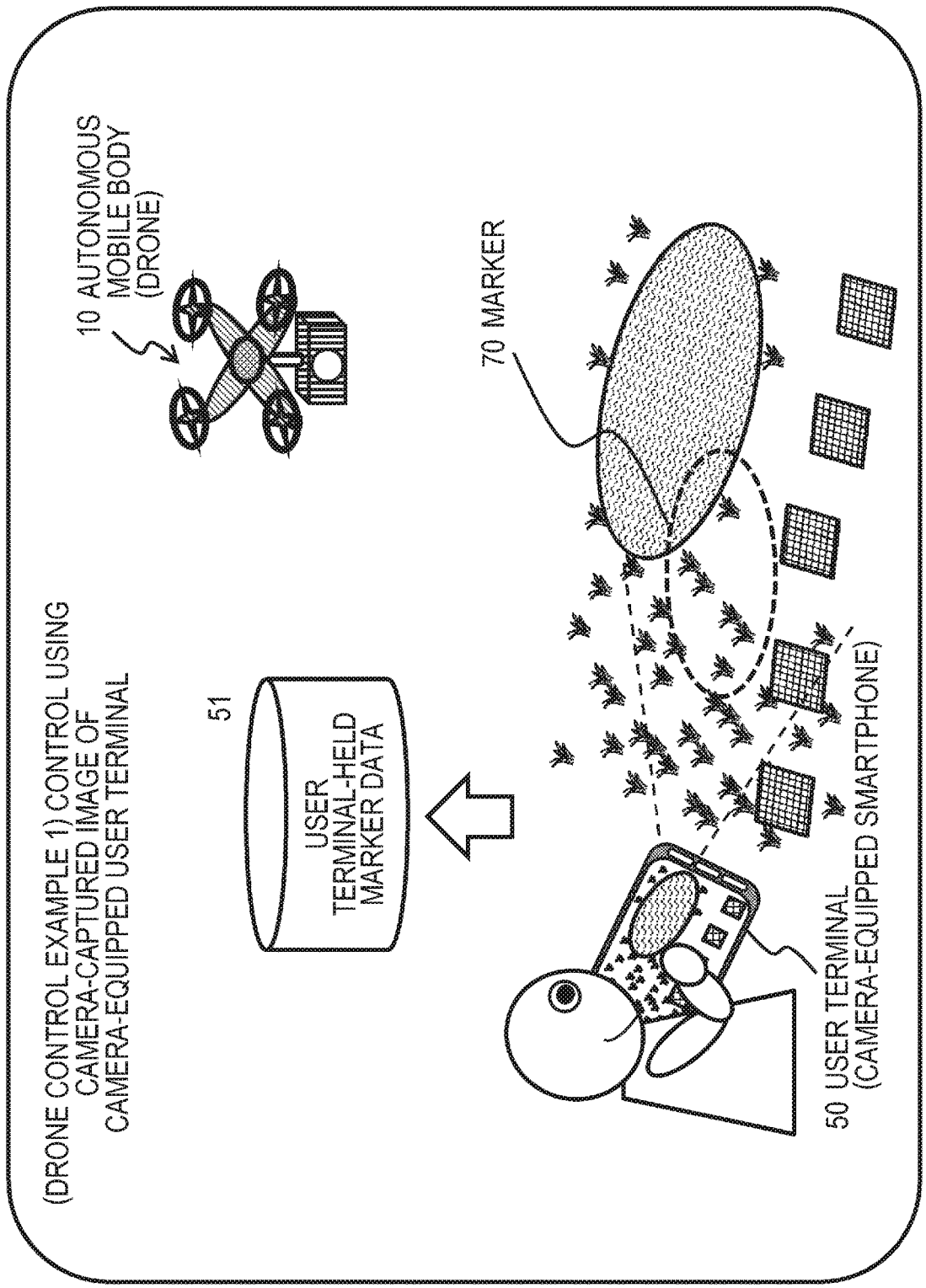
FIG. 12 is a diagram illustrating generation of marker data and recording processing.

For example, as illustrated in FIG. 12, processing of imaging a general landscape such as a lawn or a stone pavement on the ground of a park with the camera of the user terminal 50, and using a part thereof as a marker region to store marker data, which is analysis data of the marker, in the storage unit of the user terminal 50 may be performed.

Figure 13:
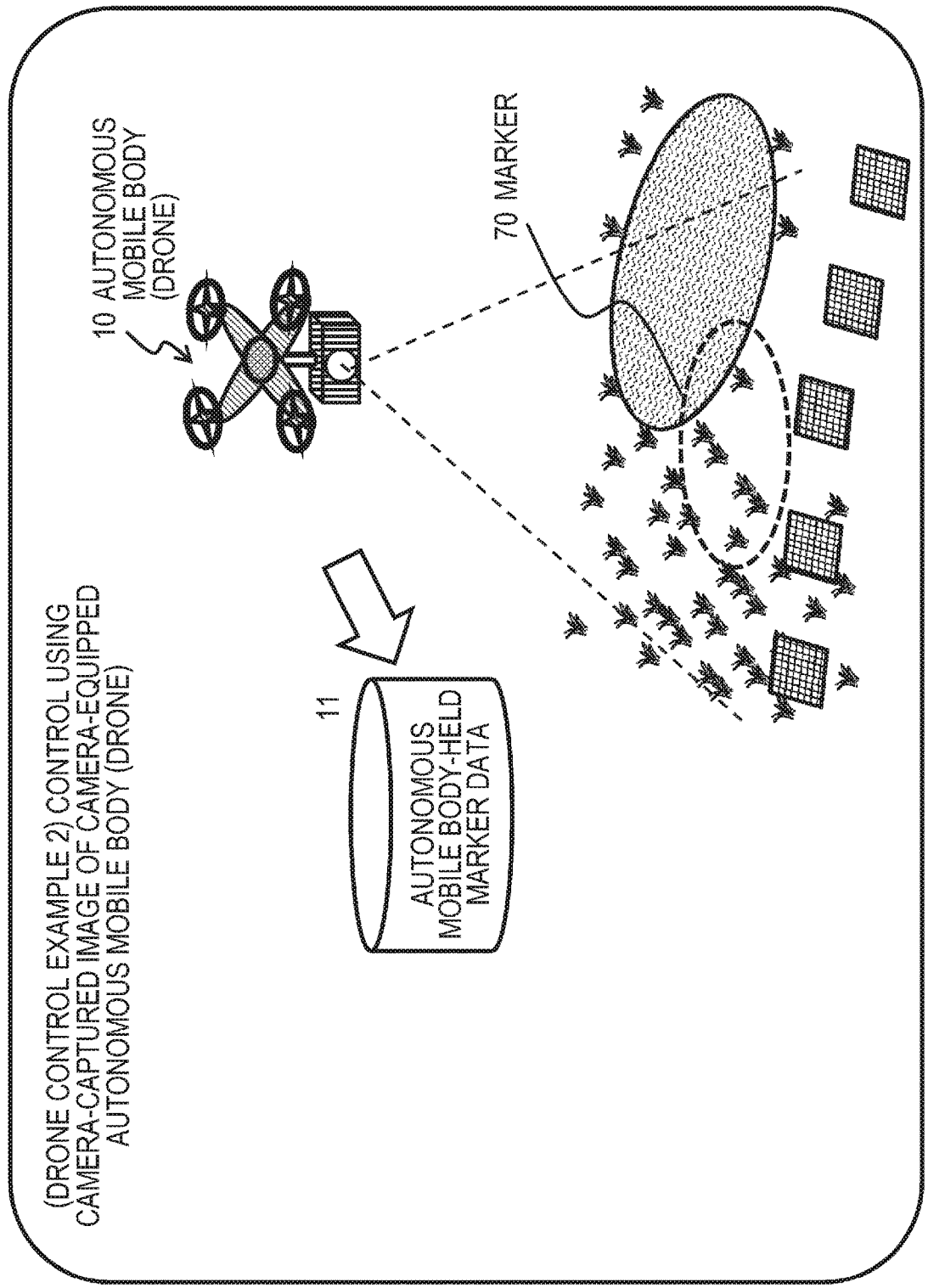
FIG. 13 is a diagram illustrating generation of marker data and recording processing.

As illustrated in FIG. 13, the autonomous mobile body (drone) 10 also images a general landscape such as a lawn or a stone pavement on the ground of the same park, and uses a part thereof as a marker region to store marker data, which is analysis data of the marker, in the storage unit of the autonomous mobile body (drone) 10.

As described above, the autonomous mobile body (drone) 10 and the user terminal 50 perform processing of imaging the marker with each camera and storing marker data, which is analysis data of the imaged marker, in the storage unit of each device.

Note that the marker data stored in the storage unit of each device includes the following data.
  (1) Feature point information capable of identifying marker region
  (2) Marker reference coordinates set on marker
  (3) Position and posture of camera at marker registration time point in marker reference coordinates Note that specific data of "(1) feature point information capable of identifying a marker region" is, for example, the following data.
  (1a) Position of feature point in 2D image coordinate system
  (1b) Local feature amount (for example, SIFT or the like) centered on the feature point
  (1c) 3D position of feature point in camera coordinate system (obtained by stereo distance measurement or distance sensor)

In addition, the position and posture of the camera in the marker reference coordinate system can be estimated by using the data of (3) above, that is, the position and posture of the camera in the marker reference coordinate system at the time of marker registration.

The "(1) feature point information capable of identifying a marker region" is feature point information detected from images captured by the autonomous mobile body (drone) 10, the user terminal 50, and each camera. It is necessary to include feature point information that enables setting of marker reference coordinates having an origin in at least the marker region.

Note that, for example, an existing method such as Harris corner detection can be applied to the feature point detection from the image.

Note that which region of the captured image is set as the marker is determined, for example, by the user 1 who operates the user terminal 50, and processing such as transmitting the marker region information to the autonomous mobile body (drone) 10 is performed. As a result, the same real object region can be shared as a marker between the autonomous mobile body (drone) 10 and the user terminal 50.

The "(2) marker reference coordinate set on the marker" is the marker reference coordinate described above with reference to FIG. 9. The marker reference coordinates are a coordinate system in which a certain configuration point of the marker, which is a real object in the real world imaged by the camera, is set as an origin.

Note that a setting mode of marker reference coordinates for the marker is previously prescribed, and the autonomous mobile body (drone) 10 and the user terminal 50 set one common marker reference coordinate for the marker according to this prescription.

For example, the marker center of the real object constituting the marker is set as the origin, the vertical upward direction is set as the z-axis direction, two orthogonal directions set in the plane of the real object, for example, the south direction is set as the x-axis direction, and the east direction is set as the y-axis direction.

Note that, as a method for obtaining the vertical upward direction, the following method can be used.

The gravity direction is estimated from the observation information obtained from the acceleration sensor of the marker registration device, and the direction opposite to the gravity direction is set as the positive direction of the z axis.

In this manner, the autonomous mobile body (drone) 10 and the user terminal 50 set one common marker reference coordinate according to the previously prescribed setting mode of the marker reference coordinates for the marker.

Note that marker data, that is, marker data including data of
(1) Feature point information capable of identifying marker region
(2) Marker reference coordinates set on marker
may be configured to be individually generated by the autonomous mobile body (drone) 10 and the user terminal 50 and stored in the storage unit of each device, or may be configured such that the data is generated by one device, and the generated data is transmitted to the other device and stored in the storage unit of each device.

Note that the "(2) marker reference coordinates set on the marker" is a coordinate system with a certain configuration point of the marker, which is a real object in the real world imaged by the camera, as an origin, and for example, the origin of the marker reference coordinates needs to be a fixed position.

Note that, for example, a configuration point whose 3D position has been confirmed using a distance sensor may be registered as the origin. If there are external parameters of the camera and the distance sensor, a 3D position of an arbitrary pixel on the camera can be detected as long as they have a common field angle range, and this 3D position may be used as the origin of the marker reference coordinates.

[4. Pre-Preparation Processing Executed by Each Device]

Next, a pre-preparation processing executed by each device of the autonomous mobile body (drone) 10 and the user terminal 50 will be described.

A plurality of processing steps executed as the pre-preparation processing will be described with reference to FIG. 14 and subsequent drawings.

(Step S1)

Figure 14:
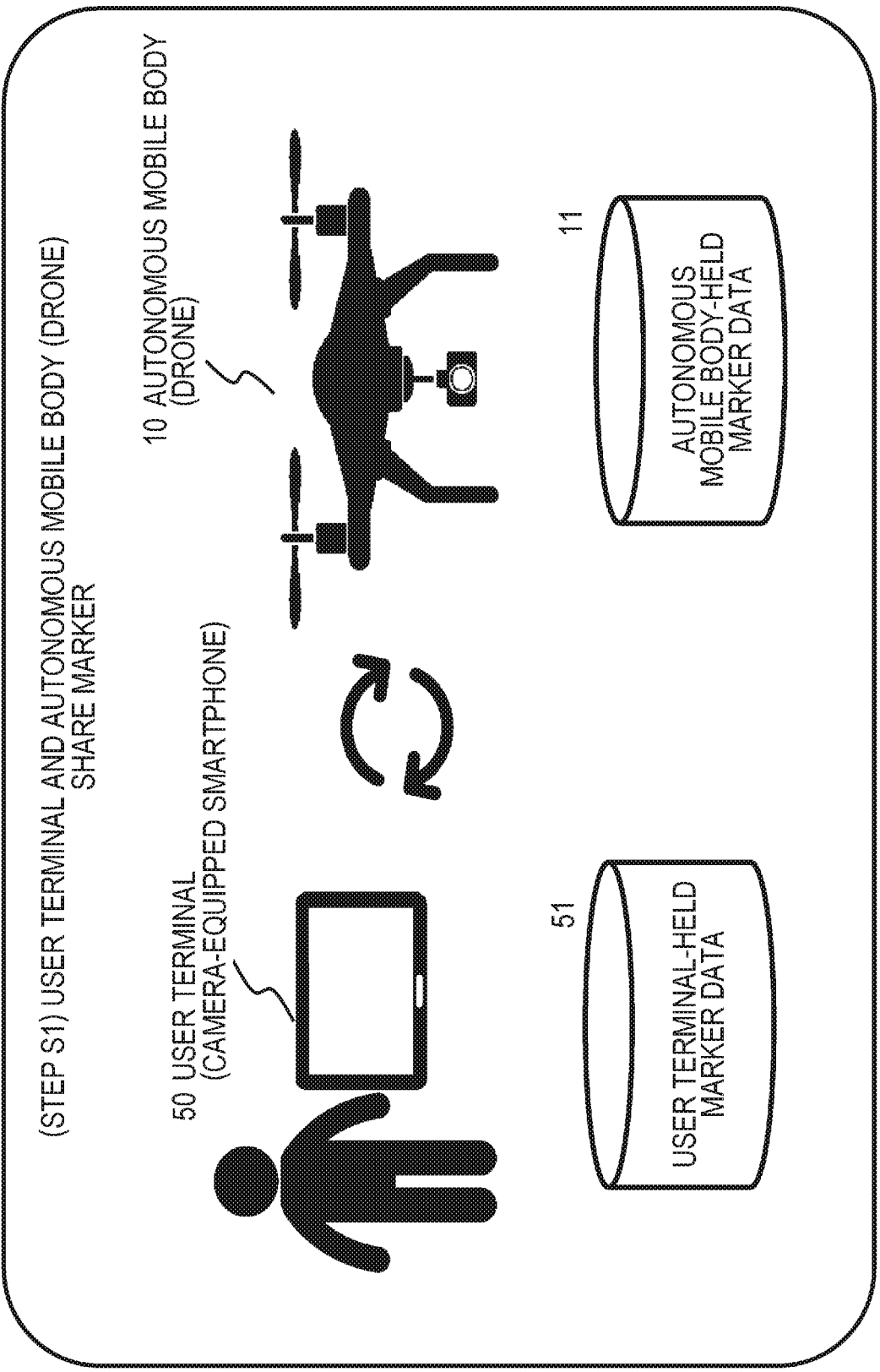
FIG. 14 is a diagram illustrating marker data sharing processing.

FIG. 14 is a diagram illustrating processing step S1. In step S1, the autonomous mobile body (drone) 10 and the user terminal 50 execute processing of sharing marker data that is analysis data of a marker of the same real object.

This processing corresponds to the processing described with reference to FIGS. 10 to 13.

The autonomous mobile body (drone) 10 and the user terminal 50 share the same marker data.

Processing of storing marker data, which is analysis data obtained from a captured image of one marker configured by a real object in the real world, in a storage unit of each device is performed.

Note that the marker data stored in the storage unit of each device includes the following data.
(1) Feature point information capable of identifying marker region
(2) Marker reference coordinates set on marker Note that specific data of "(1) feature point information capable of identifying a marker region" is, for example, the following data.
(1a) Position of feature point in 2D image coordinate system
(1b) Local feature amount (for example, SIFT or the like) centered on the feature point
(1c) 3D position of feature point in camera coordinate system (obtained by stereo distance measurement or distance sensor)

(Step S2)

Figure 15:
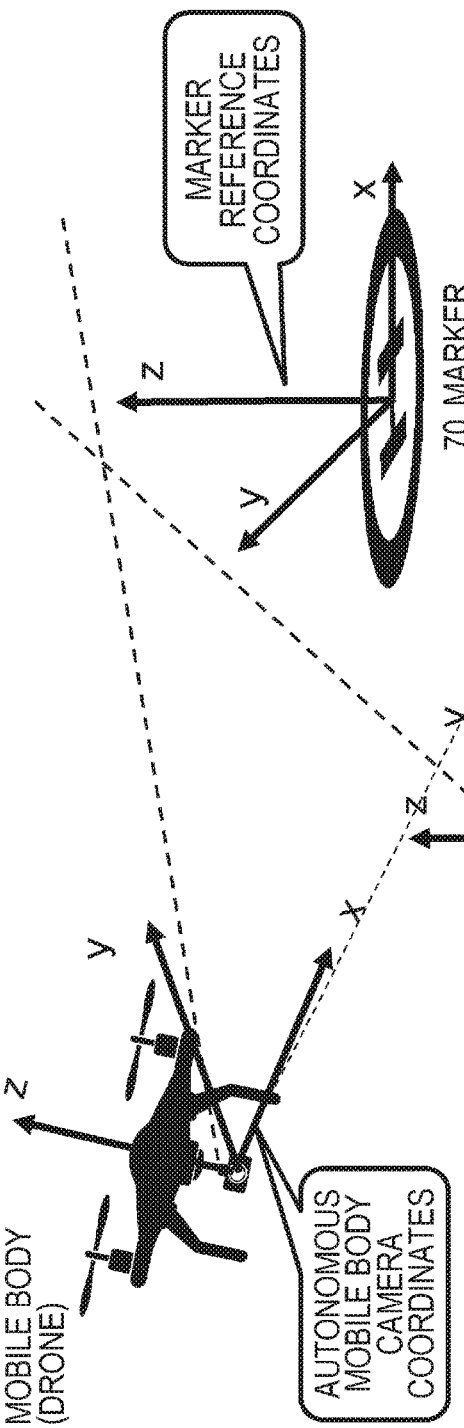
FIG. 15 is a diagram illustrating position and posture calculation processing of each device.

FIG. 15 is a diagram illustrating processing step S2. In step S2, each of the autonomous mobile body (drone) 10 and the user terminal 50 estimates the position and posture of its own device while capturing an image of the marker.

As described above with reference to FIG. 9, the autonomous mobile body (drone) 10 calculates the position and posture of the autonomous mobile body (drone) 10 by analyzing the captured image using the autonomous mobile body camera coordinate system that is the coordinate system unique to the autonomous mobile body (drone) 10.

By including the marker image in the captured image, the relative relationship (position and posture) of the autonomous mobile body camera coordinate system with respect to the marker reference coordinate system is analyzed, and the position and posture of the autonomous mobile body (drone) 10 in the marker reference coordinate system are calculated.

On the other hand, the user terminal 50 calculates the position and posture of the user terminal 50 by analyzing the captured image using a user terminal camera coordinate system that is a coordinate system unique to the user terminal 50.

By including the marker image in the captured image, the relative relationship (position and posture) of the user terminal camera coordinate system with respect to the marker reference coordinate system is analyzed, and the position and posture of the user terminal 50 in the marker reference coordinate system are calculated.

(Step S3)

Next, processing in step S3 will be described with reference to FIG. 16.

The processing in step S2 described above is position and posture calculation processing in the marker reference coordinate system of each of the autonomous mobile body (drone) 10 and the user terminal 50, but this position and posture calculation processing is possible only in a case where each of the autonomous mobile body (drone) 10 and the user terminal 50 can capture an image of the marker with each camera.

In a case where the image of the marker cannot be captured by the camera, the position and posture calculation processing of each device in step S2 cannot be executed.

The processing in step S3 is processing for enabling the position and posture calculation processing of each device even in a case where the image of the marker cannot be captured by the camera.

Specifically, simultaneous localization and mapping (SLAM) processing is executed to calculate the position and posture.

The SLAM processing is processing of executing camera position identification (localization) and environmental map creation (mapping) in parallel.

The SLAM processing is processing of estimating a three-dimensional position of a feature point by capturing an image (moving image) with a camera and analyzing trajectories of feature points included in a plurality of captured images, and estimating (localizing) a position and a posture of the camera (self), and can create (map) a surrounding map (environmental map) using three-dimensional position information of the feature point. As described above, the processing of executing the position identification (localization) of the camera (self) and the creation (mapping) of the surrounding map (environmental map) in parallel is called SLAM.

Note that, as one of the SLAM methods, there is an EKF-based SLAM using an extended Kalman filter (EKF).

The EKF-based SLAM is, for example, a method of continuously capturing images while moving a camera, obtaining a trajectory (tracking information) of a feature point included in each image, and simultaneously estimating a movement amount of the camera and a three-dimensional position of the feature point by a movement stereo method.

In this EKF-based SLAM processing, for example,
camera position, posture, velocity, angular velocity, position information of each feature point, and
"state data" including multidimensional normal distribution data as a probability distribution model including each of these pieces of information are used. The update processing of the "state data" is performed using the Kalman filter or the extended Kalman filter, and the feature point position, the camera position, and the like are estimated.

However, in the SLAM processing, processing using an SLAM coordinate system such as a world coordinate system which is a fixed coordinate system is performed.

That is, for example, the autonomous mobile body (drone) 10 first calculates the feature point position in the image captured by the camera of the autonomous mobile body (drone) 10 as the position of the autonomous mobile body camera coordinate system. However, since the autonomous mobile body camera coordinate system changes by the movement of the camera, the autonomous mobile body camera coordinate system is transformed into the position on the fixed SLAM coordinate system, and the self-position and posture are calculated by observing the position change of the feature point.

Similarly, the user terminal 50 first calculates the position of the feature point in the image captured by the camera of the user terminal 50 as the position of the user terminal camera coordinate system. However, since the user terminal camera coordinate system changes by the movement of the camera, the user terminal camera coordinate system is transformed into the position on the fixed SLAM coordinate system, and the self-position and posture are calculated by observing the position change of the feature point.

However, the SLAM coordinate system applied to the SLAM processing is a coordinate system different from the marker reference coordinate system described above.

In the processing of the present disclosure, by using the marker reference coordinate system described above as a common coordinate system used by the autonomous mobile body (drone) 10 and the user terminal 50, mutual sharing of the position and posture of each other, the position of the following target, or the like is enabled.

In order to mutually share the position and posture information of each device (autonomous mobile body (drone) 10, user terminal 50), the position of the following target, and the like, it is necessary to transform the position and posture of each device (autonomous mobile body (drone) 10, user terminal 50) in the SLAM coordinate system calculated by the SLAM processing into the position and posture in the marker reference coordinate system.

For this coordinate transformation, a coordinate transformation matrix is generated and stored in the storage unit of each device.

Figure 16:
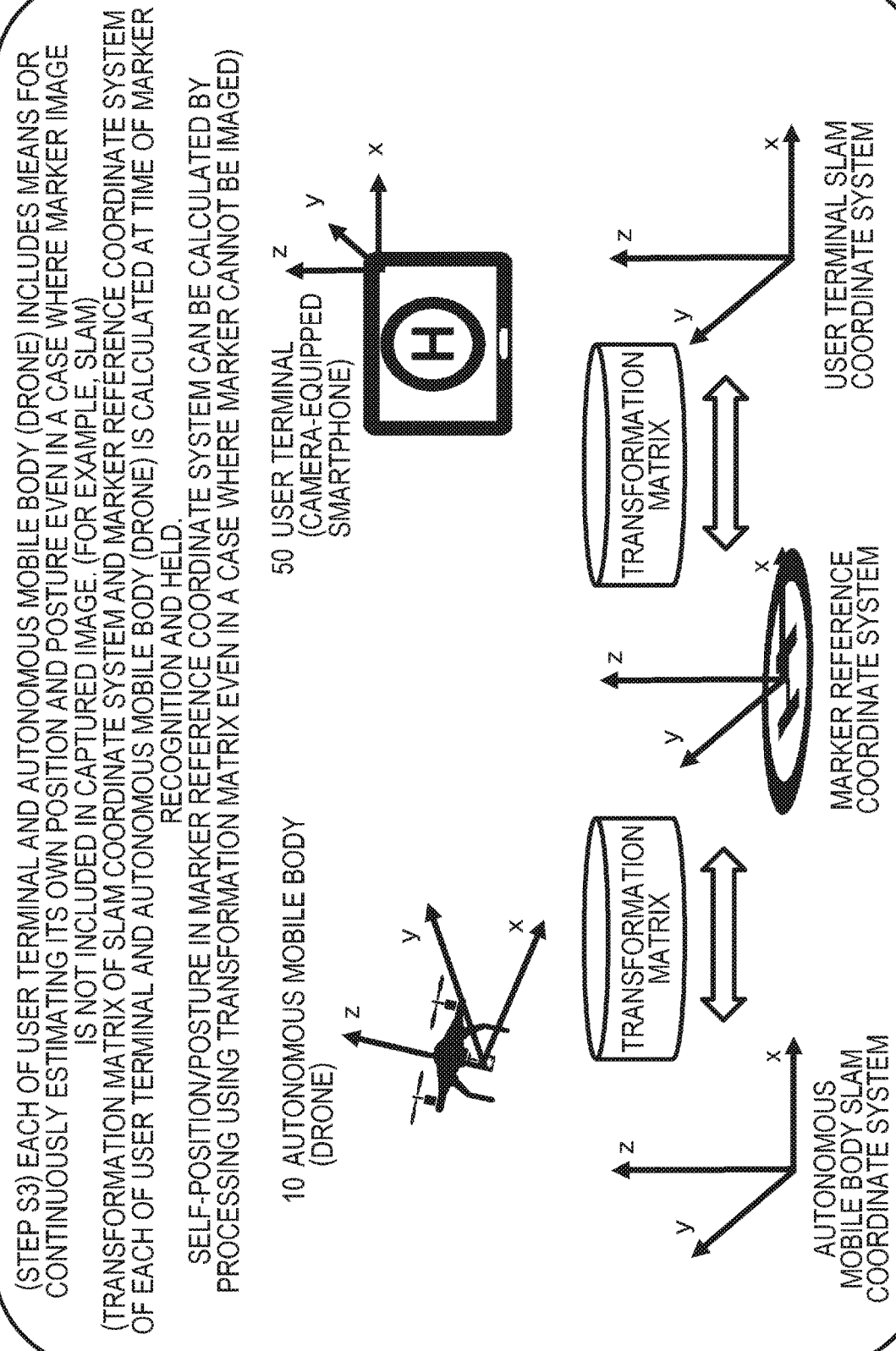
FIG. 16 is a diagram illustrating generation and recording processing of a coordinate transformation matrix.

FIG. 16 is a diagram illustrating this transformation matrix.

The autonomous mobile body (drone) 10 generates a transformation matrix of two coordinate systems of the marker standard coordinate system and the autonomous mobile body SLAM coordinate system, and stores the transformation matrices in the storage unit of the autonomous mobile body (drone) 10.

In addition, the user terminal 50 generates a transformation matrix of two coordinate systems of the marker standard coordinate system and the user terminal SLAM coordinate system, and stores the transformation matrix in the storage unit of the user terminal 50.

For example, the self-position/posture calculated by the SLAM processing of the autonomous mobile body (drone) 10 becomes the position and posture indicated in the autonomous mobile body SLAM coordinate system, and this position and posture information can be transformed into the position and posture indicated in the marker standard coordinate system by applying the transformation matrix to perform coordinate transformation.

The same applies to the user terminal 50, and the self-position/posture calculated by the user terminal 50 by the SLAM processing is the position and posture indicated in the user terminal SLAM coordinate system. However, the position and posture information can be transformed into the position and posture indicated in the marker standard coordinate system by applying the transformation matrix to perform coordinate transformation.

By performing these pre-preparation processing, the autonomous mobile body (drone) 10 and the user terminal 50 can share information such as the position and posture of each device (autonomous mobile body (drone) 10 and user terminal 50), the destination set as the landing position of the autonomous mobile body (drone) 10, and the position of the following target, with each other using the marker reference coordinate system which is one common coordinate system.

FIGS. 17A, 17B, and 17C illustrate a specific calculation processing example of a transformation matrix of two coordinate systems of a marker standard coordinate system and an autonomous mobile body SLAM coordinate system.

In addition, FIGS. 18A, 18B, and 18C illustrate a specific calculation processing example of the transformation matrix of two coordinate systems of the marker standard coordinate system and the user terminal SLAM coordinate system.

A specific calculation processing example of the transformation matrix of two coordinate systems of the marker standard coordinate system and the autonomous mobile body SLAM coordinate system illustrated in FIGS. 17A, 17B, and 17C will be described.

Note that, as illustrated in FIG. 17B, the transformation matrix is, for example, a 4×4 matrix, the upper left 3×3 elements are configured by a rotation matrix, and the right 3×1 elements are configured by elements indicating a translation vector.

The transformation matrix of the two coordinate systems of the marker standard coordinate system and the autonomous mobile body SLAM coordinate system can be calculated, as shown in Formula (A1) of FIG. 17C, by multiplication processing of the "transformation matrix between marker reference coordinate system of frame (n) and the autonomous mobile body camera coordinate system" imaged by the camera of the autonomous mobile body and the "transformation matrix between the autonomous mobile body camera coordinate system of frame (n) and the autonomous mobile body SLAM coordinate system".

Note that, as illustrated in FIGS. 17A, 17B, and 17C (Formula A2), "transformation matrix between the marker reference coordinate system and the autonomous mobile body coordinate system can be calculated by multiplication processing of the "transformation matrix between the marker reference coordinate system and the autonomous mobile body SLAM coordinate system", the "transformation matrix between the autonomous mobile body SLAM coordinate system and the autonomous mobile body camera coordinate system (estimated by SLAM)", and the "transformation matrix of the autonomous mobile body camera coordinate system and the autonomous mobile body coordinate system (estimated by design value or calibration)".

FIGS. 18A, 18B, and 18C are diagrams illustrating a specific calculation processing example of a transformation matrix of two coordinate systems of the marker standard coordinate system and the user terminal SLAM coordinate system.

The transformation matrix of the two coordinate systems of the marker standard coordinate system and the user terminal SLAM coordinate system can be calculated by multiplication processing of "transformation matrix between the marker reference coordinate system and the user terminal SLAM coordinate system" and the "transformation matrix between the user terminal SLAM coordinate system and the user terminal camera coordinate system (estimated by SLAM)" as illustrated in (Formula B1) of FIG. 18C.

Furthermore, as illustrated in (Formula B2) of FIG. 18C, the transformation matrix of the two coordinate systems of the marker standard coordinate system and the user terminal SLAM coordinate system can be calculated by multiplication processing of the "transformation matrix between marker reference coordinate system of frame (n) and user terminal camera coordinate system" imaged by the camera of the user terminal and the "transformation matrix between the user terminal camera coordinate system of frame (n) and the user terminal SLAM coordinate system".

[5. Specific Example of Processing Executable after Pre-Preparation Processing]

Next, a specific example of processing executable after the above-described pre-preparation processing will be described.

By performing the above-described pre-preparation processing, the autonomous mobile body (drone) 10 and the user terminal 50 can share information such as the position and posture of each device (autonomous mobile body (drone) 10 and user terminal 50), the destination set as the landing position of the autonomous mobile body (drone) 10, and the position of the following target using the marker reference coordinate system which is one common coordinate system.

As a result, a specific example of processing executable by the autonomous mobile body (drone) 10 and the user terminal 50 will be described.

FIG. 19 is a diagram illustrating that the user 1 captures an image of the autonomous mobile body (drone) 10 by directing the camera of the user terminal 50 toward the autonomous mobile body (drone) 10 in the sky.

Figure 20:
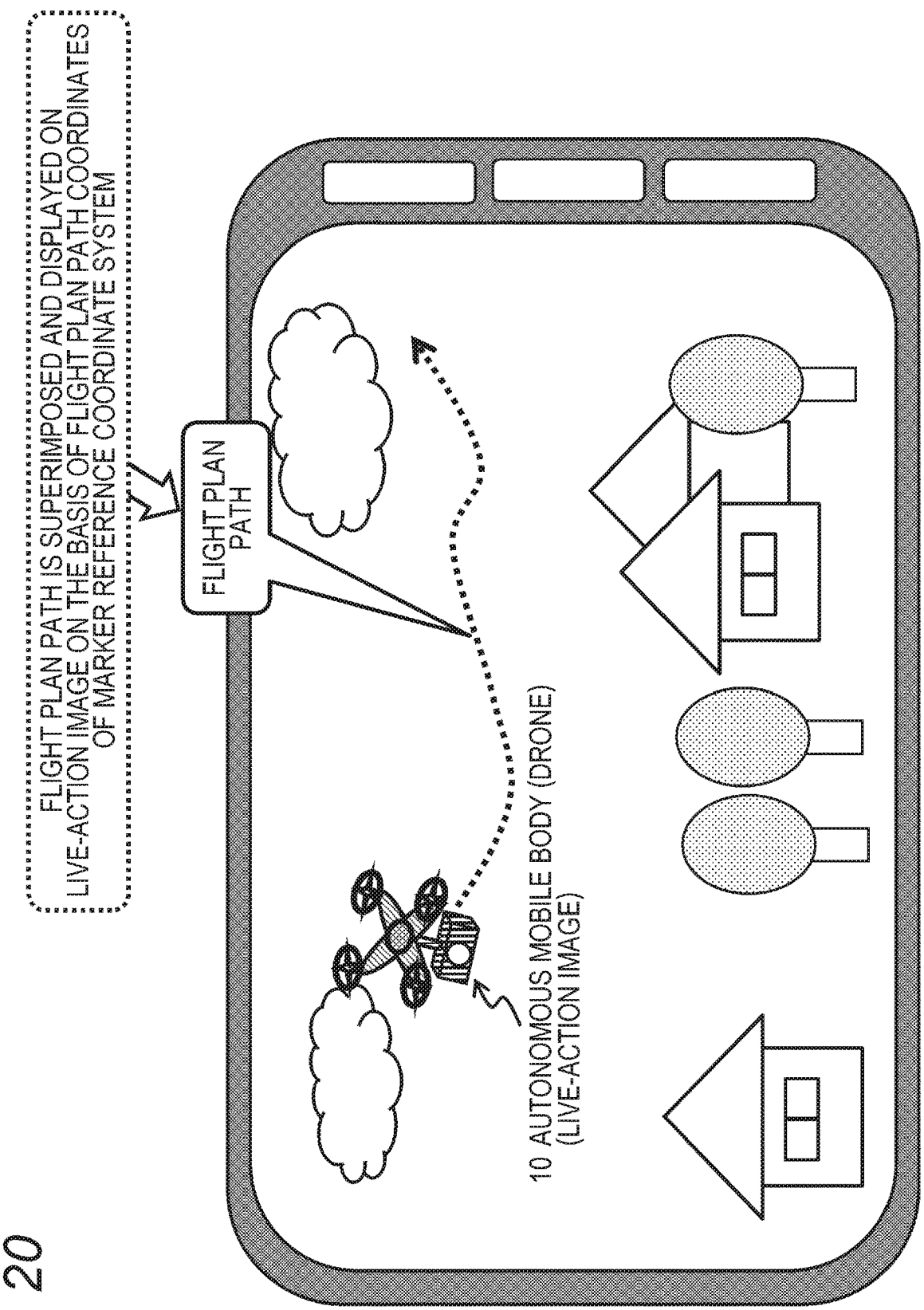
FIG. 20 is a diagram illustrating a processing example to which the configuration of the present disclosure is applied.

FIG. 20 is an example of a display image of the user terminal 50.

The image illustrated in FIG. 20 is an image captured by the camera of the user terminal 50, and an autonomous mobile body (drone) 10 is displayed. The image of the autonomous mobile body (drone) 10 is a real object actually flying in the sky.

A dotted line illustrated in the image illustrated in FIG. 20 is a virtual image generated by the data processing unit of the user terminal 50, and is a line indicating a flight plan path of the autonomous mobile body (drone) 10.

That is, it is an augmented reality (AR) image in which a virtual line indicating a flight path is superimposed on a real image of a drone.

The "flight plan path" illustrated in FIG. 20 is a scheduled flight path from the current position of the autonomous mobile body (drone) 10.

For example, the autonomous mobile body (drone) 10 can transform a flight plan path expressed by a coordinate system unique to the autonomous mobile body (drone) 10, for example, the autonomous mobile body camera coordinate system into flight plan path data according to the marker reference coordinate system by using the marker data stored in the storage unit of the autonomous mobile body (drone) 10 and the transformation matrix.

The autonomous mobile body (drone) 10 transmits the flight plan path data according to the marker reference coordinate system to the user terminal 50.

The user terminal 50 transforms the flight plan path data according to the marker reference coordinate system received from the autonomous mobile body (drone) 10 into a flight plan path expressed by a coordinate system unique to the user terminal 50, for example, the user terminal camera coordinate system by using the marker data stored in the storage unit of the user terminal 50 or the transformation matrix. The flight plan path expressed in the user terminal camera coordinate system is superimposed and displayed on the display unit on which the camera-captured image of the user terminal 50 is displayed.

Through these processing, it is possible to generate and display the image illustrated in FIG. 20, that is, the AR image in which the virtual line indicating the flight path is superimposed on the real image of the drone.

Figure 21:
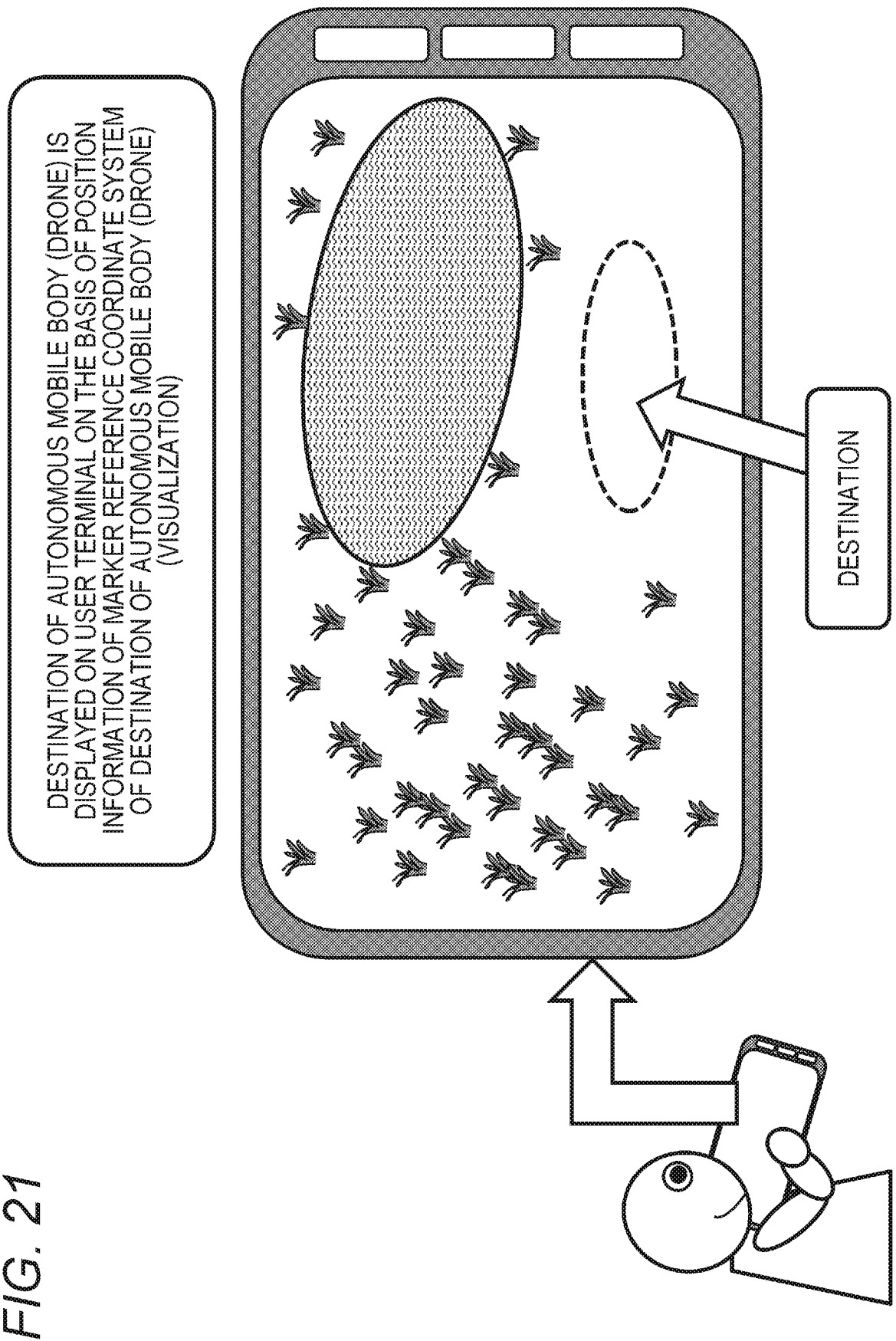
FIG. 21 is a diagram illustrating a processing example to which the configuration of the present disclosure is applied.

FIG. 21 is a diagram illustrating another specific example of processing executable by the autonomous mobile body (drone) 10 or the user terminal 50.

The user 1 touches a display unit (touch display) of the user terminal 50 to set a destination which is a landing position of the autonomous mobile body (drone) 10.

A real image captured by the camera of the user terminal 50 is displayed on the display unit of the user terminal 50, and the user 1 sets a destination on the real image.

The position information of the destination that is the landing position of the autonomous mobile body (drone) 10 input to the user terminal 50 is first acquired as position information expressed in a coordinate system unique to the user terminal 50, for example, a user terminal camera coordinate system in the data processing unit of the user terminal 50.

The data processing unit of the user terminal 50 transforms the position data of the destination expressed in the user terminal camera coordinate system into position data according to the marker reference coordinate system using the marker data stored in the storage unit of the user terminal 50 or the transformation matrix.

The user terminal 50 transmits position data indicating a destination (landing position) according to the generated marker reference coordinate system to the autonomous mobile body (drone) 10.

The autonomous mobile body (drone) 10 transforms the position data indicating the destination (landing position) according to the marker reference coordinate system into the position data expressed by the coordinate system unique to the autonomous mobile body (drone) 10, for example, the autonomous mobile body camera coordinate system using the marker data stored in the storage unit of the autonomous mobile body (drone) 10 and the transformation matrix. The autonomous mobile body (drone) 10 flies toward the destination (landing position) indicated by the position data expressed in the autonomous mobile body camera coordinate system and lands.

By performing such processing, the autonomous mobile body (drone) 10 can accurately grasp the position of the destination set by the user 1, and can determine the flight path to the destination, fly toward the destination, and land at the destination.

Figure 22:
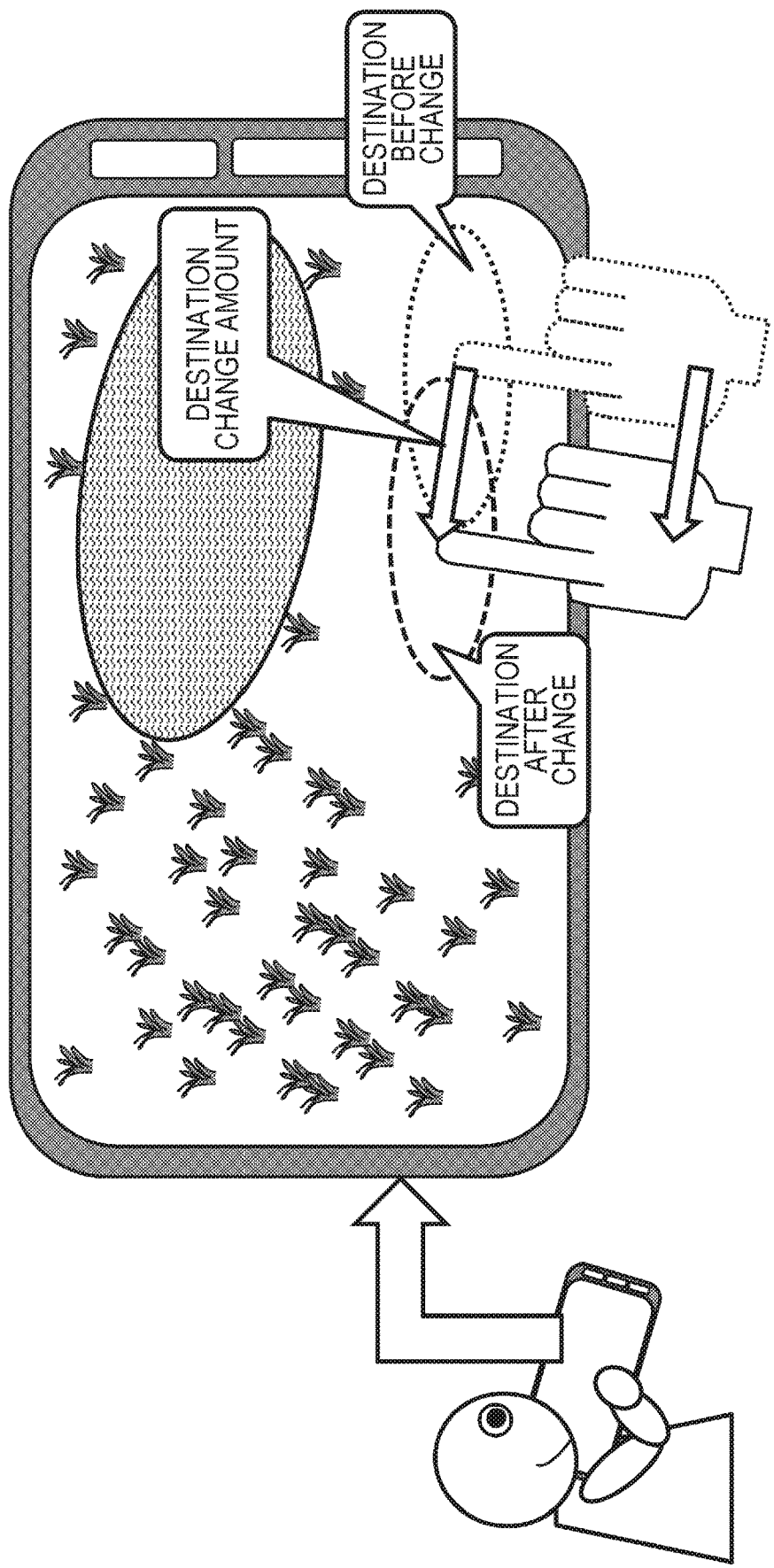
FIG. 22 is a diagram illustrating a processing example to which the configuration of the present disclosure is applied.

Furthermore, as illustrated in FIG. 22, in a case where the user 1 sets a destination on the real image captured by the camera of the user terminal 50 and then performs processing of changing the destination, the data processing unit of the user terminal 50 transforms the position data of the new destination after the change into the position data of the marker reference coordinate system and transmits the transformed position data to the autonomous mobile body (drone) 10.

The autonomous mobile body (drone) 10 transforms position data indicating a new destination (landing position) according to the marker reference coordinate system into position data expressed by a coordinate system unique to the autonomous mobile body (drone) 10, for example, the autonomous mobile body camera coordinate system, using the marker data stored in the storage unit of the autonomous mobile body (drone) 10 or the transformation matrix. The autonomous mobile body (drone) 10 can fly toward the destination (landing position) indicated by the position data expressed in the autonomous mobile body camera coordinate system and land.

FIGS. 23A and 23B illustrate a specific example of calculation processing of a vector indicating a destination position in a marker reference coordinate system.

Note that, as illustrated in FIG. 23A, the vector indicating the position to the point X in the BASE coordinate system is indicated as 4×1 matrix data of 4 rows and 1 column.

As illustrated in FIG. 23B, the vector indicating the destination position in the marker reference coordinate system can be calculated by multiplication processing of a matrix of the "transformation matrix of the marker reference coordinate system and the user terminal camera" and the "vector (transform 2D points on image coordinates into 3D points by stereo distance measurement or distance sensor) representing position of destination point (Dest) in the user terminal camera coordinate system".

FIG. 24 is a diagram illustrating another specific example of processing executable by the autonomous mobile body (drone) 10 or the user terminal 50.

The example illustrated in FIG. 24 is an example in which the autonomous mobile body (drone) 10 performs tracking processing on a specific tracking target.

As described above with reference to FIG. 7, in a case where the autonomous mobile body (drone) 10 performs tracking processing on a specific tracking target, the tracking target is normally imaged by the camera of the autonomous mobile body (drone) 10, and a flight toward the tracking target in the image is performed.

That is, as in the example illustrated in the upper part of FIG. 7, an image is captured so that the tracking target A falls within the viewing angle of the drone camera that is the camera of the autonomous mobile body (drone) 10, and a flight toward the tracking target in the image is performed.

However, in a case where the tracking target is out of the viewing angle of the drone camera, tracking cannot be performed.

By applying the configuration and processing of the present disclosure, the tracking processing can be performed even in such a case.

As illustrated in FIG. 24, in a case where the tracking target X is imaged by the camera of the user terminal 50, three-dimensional position information of the tracking target X is acquired. The three-dimensional position information of the tracking target X is first acquired as position information expressed in a coordinate system unique to the user terminal 50, for example, a user terminal camera coordinate system in the data processing unit of the user terminal 50.

The data processing unit of the user terminal 50 transforms the three-dimensional position data of the tracking target X expressed in the user terminal camera coordinate system into position data according to the marker reference coordinate system using the marker data stored in the storage unit of the user terminal 50 or the transformation matrix.

The user terminal 50 transmits the three-dimensional position data of the tracking target X according to the generated marker reference coordinate system to the autonomous mobile body (drone) 10.

The autonomous mobile body (drone) 10 transforms the three-dimensional position data of the tracking target X according to the marker reference coordinate system into position data expressed by a coordinate system unique to the autonomous mobile body (drone) 10, for example, the autonomous mobile body camera coordinate system, using the marker data stored in the storage unit of the autonomous mobile body (drone) 10 or the transformation matrix. The autonomous mobile body (drone) 10 can fly toward the three-dimensional position of the tracking target X indicated by the position data expressed in the autonomous mobile body camera coordinate system and perform tracking processing.

As described above, by applying the configuration and the processing of the present disclosure, the autonomous mobile body (drone) 10 can track the tracking target that is not within the viewing angle of the drone camera that is the camera of the autonomous mobile body (drone) 10.

[6. Sequence of Processing Executed by Information Processing Device of Present Disclosure]

Next, a sequence of processing executed by the information processing device of the present disclosure will be described.

Note that the information processing device of the present disclosure includes an autonomous mobile body (drone) 10 and a user terminal 50.

A sequence of processing executed by the information processing device of the present disclosure will be described with reference to the flowchart in FIG. 25 and subsequent drawings.

The following sequence of each processing will be sequentially described.

Figure 25:
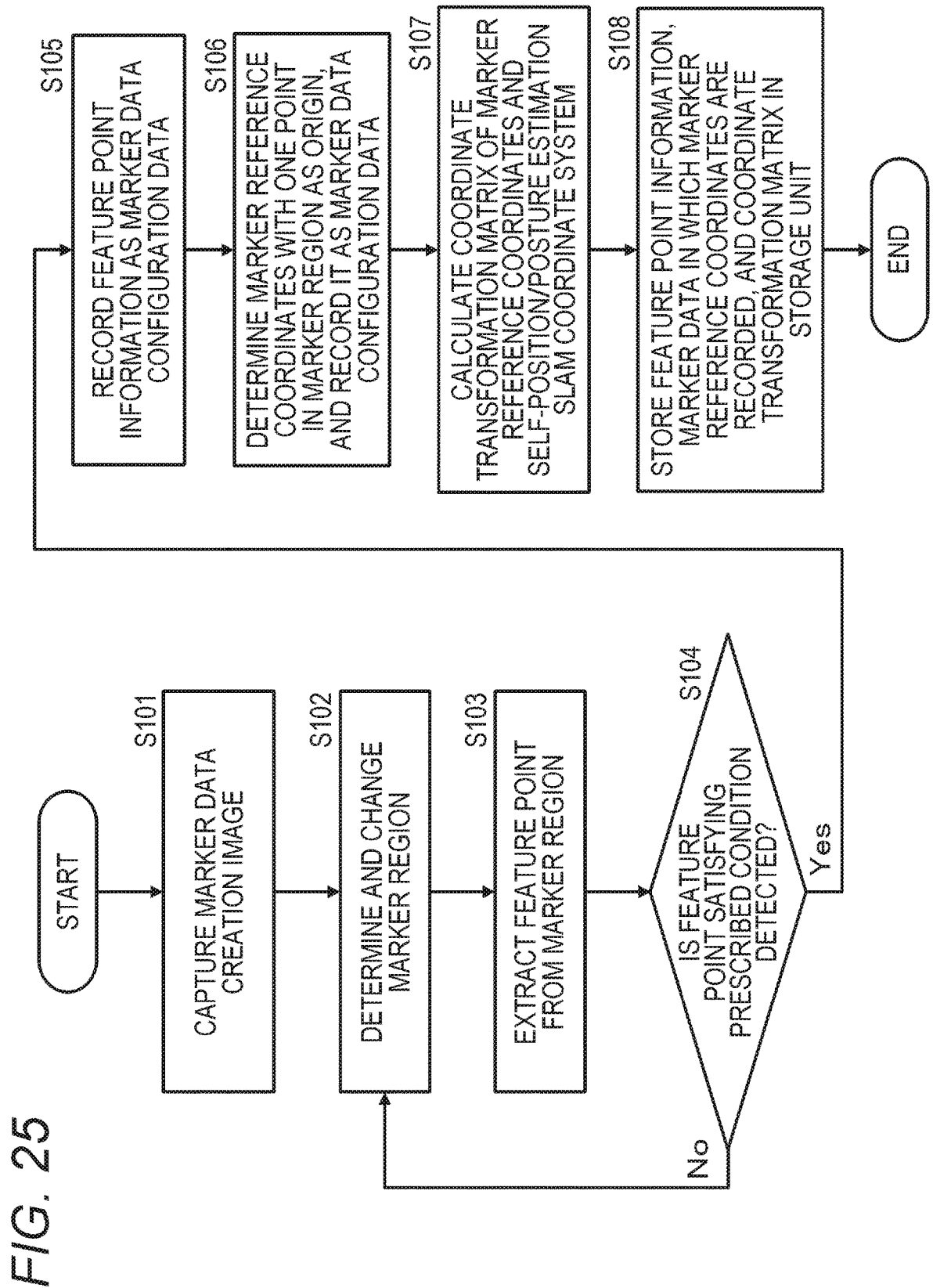
FIG. 25 is a flowchart illustrating a sequence of processing executed by the information processing device of the present disclosure.

(1) Sequence of processing of generation of marker data and transformation matrix and storage in storage unit
(2) Marker confirmation processing sequence
(3) Self-position/posture calculation processing sequence according to marker reference coordinates
(4) Landing sequence of autonomous mobile body (drone) to destination
(5) Tracking sequence of tracking target imaged in captured image of drone camera of autonomous mobile body (drone)
(6) Tracking sequence of tracking target imaged in captured image of user terminal camera of user terminal Note that processing according to the flowcharts illustrated in FIG. 25 and subsequent drawings can be executed under the control of a control unit (data processing unit) including a CPU or the like having a program execution function of the information processing device in accordance with a program stored in a memory inside the information processing device.

(6-(1) Sequence of Processing of Generation of Marker Data and Transformation Matrix and Storage in Storage Unit)

First, a sequence of processing of generation of marker data and a transformation matrix and storage in storage unit will be described.

FIG. 25 is a flowchart illustrating a sequence of processing of generation of marker data and a transformation matrix and storage in a storage unit.

Note that the processing according to this flow is processing executed in each of the autonomous mobile body (drone) 10 and the user terminal 50. The processing of each step of the flow illustrated in FIG. 25 is executed using, for example, various processing execution units provided in each device such as a data processing unit and a camera of each device.

Hereinafter, processing of each step of the flow illustrated in FIG. 25 will be sequentially described.

(Step S101)

First, in step S101, the camera of the information processing device (autonomous mobile body (drone) 10, user terminal 50) captures a marker data creation image.

That is, a real world image including the marker region is captured.

As described above with reference to FIGS. 10 to 13, the markers imaged by the autonomous mobile body (drone) 10 and the user terminal 50 are the same real objects existing in the real world.

In the examples of FIGS. 10 and 11, a character region of "H" is illustrated as a marker, but this is an example for describing the marker in an easy-to-understand manner. Even without such a character region, for example, as illustrated in FIGS. 12 and 13, a part of a general landscape such as lawn or stone pavement on the ground of a park can be set as a marker.

(Step S102)

Next, in step S102, the data processing unit of the information processing device (autonomous mobile body (drone) 10, user terminal 50) determines a marker region from the marker data creation image captured by the camera.

This determination processing is executed by applying, for example, input by a user, region selection processing by a previously prescribed image region selection algorithm such as a central region of a captured image, or the like.

(Step S103)

Next, in step S103, the data processing unit of the information processing device (autonomous mobile body (drone) 10, user terminal 50) extracts feature points from the marker region determined in step S102.

As described above, for example, an existing method such as Harris corner detection can be applied to the feature point detection from the image.

(Step S104)

Next, in step S104, the data processing unit of the information processing device (autonomous mobile body (drone) 10, user terminal 50) determines whether or not the feature point data of the marker region extracted in step S103 satisfies a previously prescribed condition.

The prescribed condition is, for example, a condition such as whether the number of extracted feature points is equal to or larger than a prescribed threshold, and whether an identification level of the extracted feature point is equal to or larger than a prescribed threshold level. The determination processing in step S104 is executed as processing of determining whether or not the feature point extracted in step S103 is a feature point at a level at which a marker region can be reliably extracted from various camera-captured images.

In a case where it is determined in step S104 that the feature point data of the marker region extracted in step S103 satisfies the previously prescribed condition, the process proceeds to step S105.

On the other hand, in a case where it is determined that the feature point data of the marker region extracted in step S103 does not satisfy the previously prescribed condition, the process returns to step S102.

In this case, in step S102, the marker region change processing is executed, and the processing of steps S103 to S104 is repeated.

(Step S105)

In a case where it is determined in step S104 that the feature point data of the marker region extracted in step S103 satisfies the previously prescribed condition, the process proceeds to step S105.

In step S105, the data processing unit of the information processing device (autonomous mobile body (drone) 10, user terminal 50) creates marker data in which the feature point information of the marker region extracted in step S103 is described.

(Step S106)

Next, in step S106, the data processing unit of the information processing device (autonomous mobile body (drone) 10, user terminal 50) determines marker reference coordinates with one point constituting the marker region as an origin.

Note that the marker reference coordinates are the marker reference coordinates described above with reference to FIG. 9 and the like. The marker reference coordinates are a coordinate system in which a certain configuration point of the marker, which is a real object in the real world imaged by the camera, is set as an origin.

A setting mode of marker reference coordinates for the marker is previously prescribed, and the autonomous mobile body (drone) 10 and the user terminal 50 set one common marker reference coordinate for the marker according to this prescription.

For example, the marker center of the real object constituting the marker is set as the origin, the vertical upward direction is set as the z-axis direction, two orthogonal directions set in the plane of the real object, for example, the south direction is set as the x-axis direction, and the east direction is set as the y-axis direction.

In this manner, the autonomous mobile body (drone) 10 and the user terminal 50 determine one common marker reference coordinate according to the previously prescribed setting mode of the marker reference coordinate with respect to the marker.

(Step S107)

Next, in step S107, the data processing unit of the information processing device (autonomous mobile body (drone) 10, user terminal 50) calculates a coordinate transformation matrix of the marker reference coordinates and the SLAM coordinates to be applied to the self-position and posture estimation.

As described above with reference to FIG. 16, the autonomous mobile body (drone) 10 generates a transformation matrix of two coordinate systems of the marker standard coordinate system and the autonomous mobile body SLAM coordinate system.

Further, the user terminal 50 generates a transformation matrix of two coordinate systems of the marker standard coordinate system and the user terminal SLAM coordinate system.

Note that, as described above, the SLAM coordinate system is a coordinate system used in simultaneous localization and mapping (SLAM) processing in which camera position identification (localization) and environment map creation (mapping) are executed in parallel. For example, a world coordinate system that is a fixed coordinate system is used.

In step S107, each of the information processing devices (autonomous mobile body (drone) 10, user terminal 50) calculates a coordinate transformation matrix of the marker reference coordinates and the SLAM coordinates to be applied to the self-position and posture estimation.

(Step S108)

Next, in step S108, the data processing unit of the information processing device (autonomous mobile body (drone) 10, user terminal 50) stores the feature point information, the marker data in which the marker reference coordinates are recorded, and the coordinate transformation matrix in the storage unit.

That is, marker data in which the feature point information generated in steps S105 to S106 and marker reference coordinates are recorded; and a coordinate transformation matrix of the marker reference coordinate system and the SLAM coordinate system generated in step S107, these pieces of data are stored in a storage unit of each device.

Note that the processing according to the flow illustrated in FIG. 25 may be executed individually for each of the autonomous mobile body (drone) 10 and the user terminal 50 to individually generate the marker data and the coordinate transformation matrix and store the marker data and the coordinate transformation matrix in the storage unit of each device, or may be configured such that one device generates the data, transmits the generated data to the other device, and stores the data in the storage unit of each device.

Note that, after executing the processing according to the flow illustrated in FIG. 25, for example, the autonomous mobile body (drone) 10 can calculate the self-position/posture and flight path information as the position and posture information on the marker reference coordinates.

For example, the autonomous mobile body (drone) 10 transmits the calculated position and posture information, and flight path information of the autonomous mobile body (drone) 10 on the marker reference coordinates to the user terminal 50.

The user terminal 50 transforms the position and posture information, and flight path information of the autonomous mobile body (drone) 10 on the marker reference coordinates received from the autonomous mobile body (drone) 10 into position and posture information, and flight path information on the user terminal camera coordinates by applying the coordinate transformation matrix stored in the storage unit. By using this transformation result, the flight path of the autonomous mobile body (drone) 10 can be displayed on the display unit of the user terminal 50.

That is, it is possible to generate and display the AR image as illustrated in FIG. 20.

(6-(2) Marker Confirmation Processing Sequence)

Next, a marker confirmation processing sequence will be described.

Figure 26:
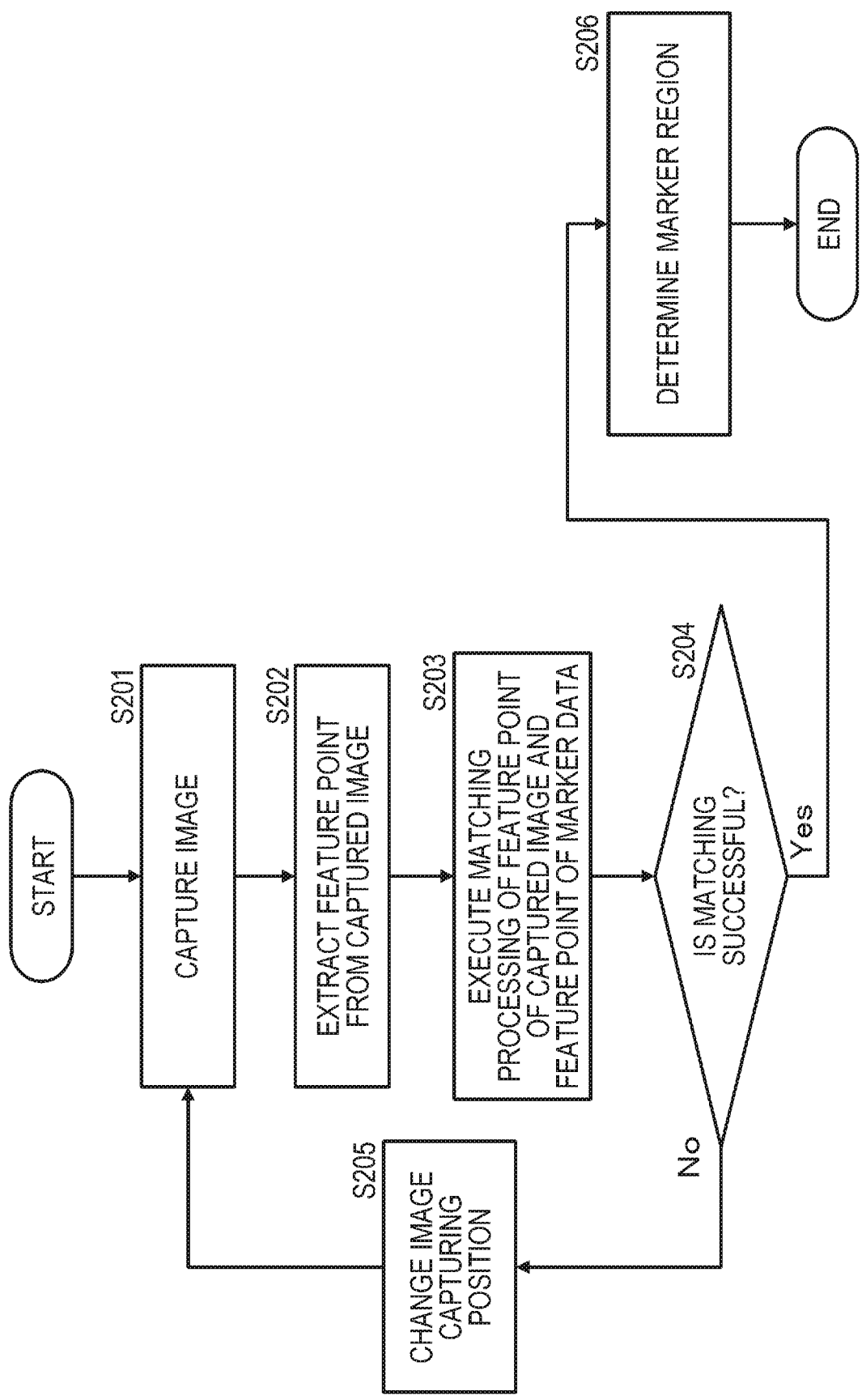
FIG. 26 is a flowchart illustrating a sequence of processing executed by the information processing device of the present disclosure.

FIG. 26 is a flowchart illustrating a marker confirmation processing sequence.

The processing according to the flow illustrated in FIG. 26 is processing executed after completion of the processing according to the flow illustrated in FIG. 25, that is, after completion of the generation processing of the marker data and the coordinate transformation matrix and the storage processing in the storage unit.

Note that the processing according to this flow is processing executed mainly by the autonomous mobile body (drone) 10 flying in the sky. The processing of each step of the flow illustrated in FIG. 26 is executed using, for example, various processing execution units provided in the autonomous mobile body (drone) 10, such as a data processing unit and a camera of the autonomous mobile body (drone) 10.

Hereinafter, processing of each step of the flow illustrated in FIG. 26 will be sequentially described.

(Step S201)

First, in step S201, the autonomous mobile body (drone) 10 flying in the sky captures an image using the drone camera.

(Step S202)

Next, in step S202, the data processing unit of the autonomous mobile body (drone) 10 executes feature point extraction processing from the captured image acquired in step S201.

(Step S203)

Next, in step S203, the data processing unit of the autonomous mobile body (drone) 10 executes matching processing of comparing the feature point of the captured image extracted in step S202 with the feature point information recorded in the marker data stored in the storage unit.

(Step S204)

Next, in step S204, the data processing unit of the autonomous mobile body (drone) 10 obtains a matching rate equal to or greater than a previously prescribed threshold as a result of the matching processing in step S203, and determines whether or not the matching has succeeded.

Note that processing of obtaining a matching rate equal to or greater than a previously prescribed threshold and determining that matching has been successful has the same meaning as processing of determining that a marker has been detected in the captured image.

In a case where it is determined in step S204 that the matching rate equal to or greater than the previously prescribed threshold has not been obtained and the matching has failed, the process proceeds to step S205.

On the other hand, in a case where it is determined in step S204 that the matching rate equal to or greater than the previously prescribed threshold has been obtained and the matching has been successful, the process proceeds to step S206.

(Step S205)

In a case where it is determined in step S204 that the matching rate equal to or greater than the previously prescribed threshold has not been obtained and the matching has failed, the process proceeds to step S205.

In step S205, the image capturing position of the camera of the flying autonomous mobile body (drone) 10 is changed, and in step S201, a new captured image is acquired. Further, the processing of steps S202 to S204 is executed on the new captured image.

(Step S206)

On the other hand, in a case where it is determined in step S204 that the matching rate equal to or greater than the previously prescribed threshold has been obtained and the matching has been successful, the process proceeds to step S206.

In step S206, the data processing unit of the autonomous mobile body (drone) 10 identifies, as a marker region, a Li image region for which a matching rate equal to or greater than a previously prescribed threshold has been obtained and matching has been successful.

Note that the processing according to the flow illustrated in FIG. 26 is processing mainly executed by the autonomous mobile body (drone) 10 flying in the sky, but can also be executed by the user terminal 50. The processing can also be executed as processing in which the user moves while holding the user terminal 50, captures an image with the camera of the user terminal 50, and detects the marker region from the captured image.

(6-(3) Self-Position/Posture Calculation Processing Sequence According to Marker Reference Coordinates)

Next, a self-position/posture calculation processing sequence according to the marker reference coordinates will be described.

Figure 27:
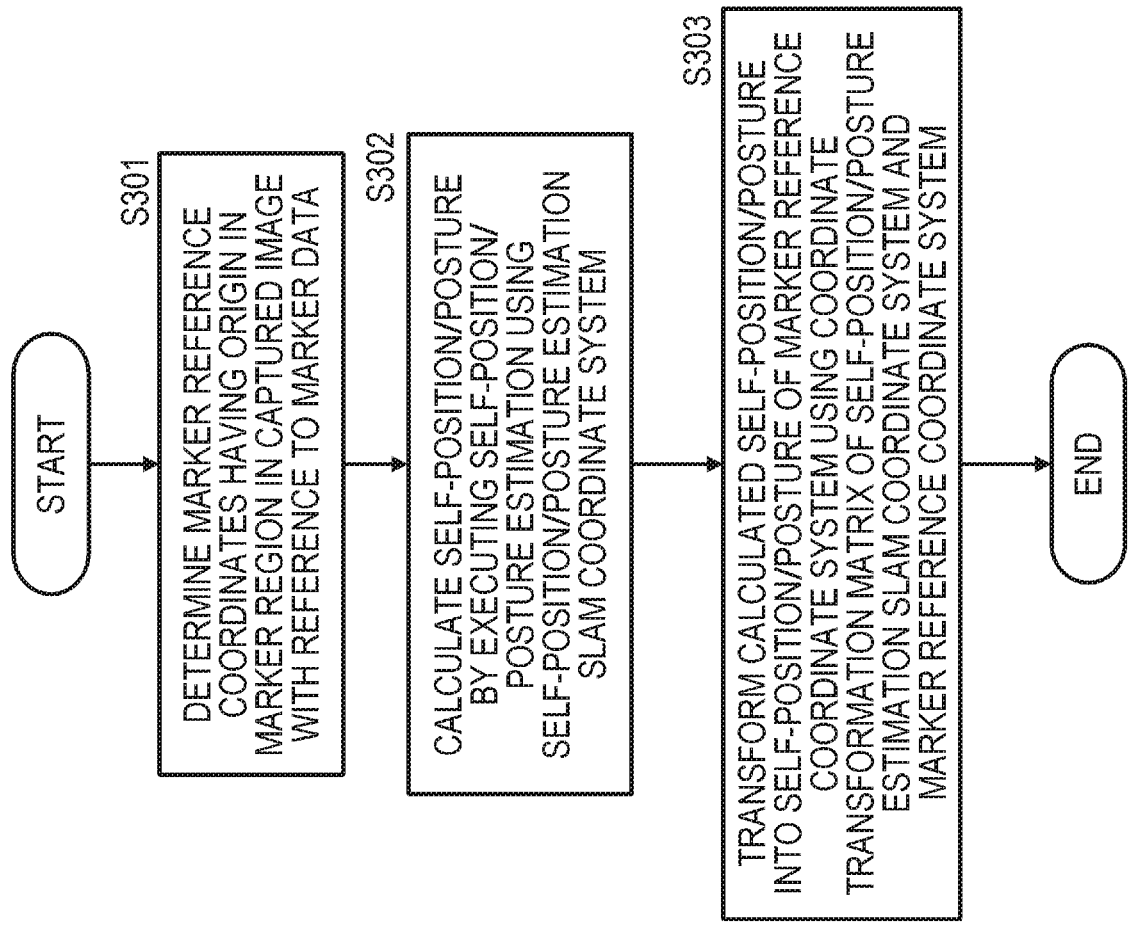
FIG. 27 is a flowchart illustrating a sequence of processing executed by the information processing device of the present disclosure.

FIG. 27 is a flowchart illustrating a self-position/posture calculation processing sequence according to the marker reference coordinates.

Note that the processing according to the flow illustrated in FIG. 27 is processing executed after the processing according to the flow illustrated in FIG. 26 is completed and the marker region is detected from the captured image.

Note that the processing according to this flow is processing executed in each of the autonomous mobile body (drone) 10 and the user terminal 50. The processing of each step of the flow illustrated in FIG. 27 is executed using, for example, various processing execution units provided in each device such as a data processing unit and a camera of each device.

Hereinafter, processing of each step of the flow illustrated in FIG. 27 will be sequentially described.

(Step S301)

First, in step S301, the data processing unit of the information processing device (autonomous mobile body (drone) 10, user terminal 50) refers to the marker data stored in the storage unit, and determines marker reference coordinates having an origin in the marker region in the captured image.

Note that the captured image is a captured image in which the marker region is detected according to the flow described with reference to FIG. 26.

The data processing unit of the information processing device (autonomous mobile body (drone) 10, user terminal 50) determines the marker reference coordinates having the origin in the captured image marker region in which the marker region is detected according to the flow described with reference to FIG. 26.

Note that the relative relationship between the marker and the marker reference coordinate is previously prescribed, and the data processing unit of each device determines the marker reference coordinate with the configuration point of the marker region as the origin according to this prescription.

(Step S302)

Next, in step S302, the data processing unit of the information processing device (autonomous mobile body (drone) 10, user terminal 50) executes self-position/posture estimation processing.

Specifically, simultaneous localization and mapping (SLAM) processing is executed to calculate the position and posture.

As described above, the SLAM processing is processing of executing the camera position identification (localization) and the environmental map creation (mapping) in parallel.

Note that, in the SLAM processing, processing using an SLAM coordinate system such as the world coordinate system, which is a fixed coordinate system, is performed.

That is, for example, the autonomous mobile body (drone) 10 first calculates the feature point position in the image captured by the camera of the autonomous mobile body (drone) 10 as the position of the autonomous mobile body camera coordinate system. However, since the autonomous mobile body camera coordinate system changes by the movement of the camera, the autonomous mobile body camera coordinate system is transformed into the position on the fixed SLAM coordinate system, and the self-position and posture are calculated by observing the position change of the feature point.

Similarly, the user terminal 50 first calculates the position of the feature point in the image captured by the camera of the user terminal 50 as the position of the user terminal camera coordinate system. However, since the user terminal camera coordinate system changes by the movement of the camera, the user terminal camera coordinate system is transformed into the position on the fixed SLAM coordinate system, and the self-position and posture are calculated by observing the position change of the feature point.

(Step S303)

Next, in step S303, the data processing unit of the information processing device (autonomous mobile body (drone) 10, user terminal 50) executes processing of transforming the self-position-and-posture information on the SLAM coordinates calculated in step S302 into the self-position-and-posture information on the marker reference coordinates.

For this coordinate transformation processing, the coordinate transformation matrix generated according to the flow illustrated in FIG. 25 described above and stored in the storage unit is applied.

According to the flow illustrated in FIG. 25 described above, the autonomous mobile body (drone) 10 generates a transformation matrix of two coordinate systems of the marker standard coordinate system and the autonomous mobile body SLAM coordinate system, and stores the transformation matrix in the storage unit of the autonomous mobile body (drone) 10.

Further, the user terminal 50 generates a transformation matrix of two coordinate systems of the marker standard coordinate system and the user terminal SLAM coordinate system, and stores the transformation matrix in the storage unit of the user terminal 50.

For example, the self-position/posture calculated by the SLAM processing of the autonomous mobile body (drone) 10 becomes the position and posture indicated in the autonomous mobile body SLAM coordinate system, and this position and posture information can be transformed into the position and posture indicated in the marker standard coordinate system by applying the transformation matrix to perform coordinate transformation.

The same applies to the user terminal 50, and the self-position/posture calculated by the user terminal 50 by the SLAM processing is the position and posture indicated in the user terminal SLAM coordinate system. However, the position and posture information can be transformed into the position and posture indicated in the marker standard coordinate system by applying the transformation matrix to perform coordinate transformation.

(6-(4) Landing Sequence of Autonomous Mobile Body (Drone) to Destination)

Next, a landing sequence of the autonomous mobile body (drone) to a destination will be described.

Specifically, this processing is, for example, processing of landing the autonomous mobile body (drone) 10 on the destination set by the user 1 as described above with reference to FIGS. 21 and 22.

Figure 28:
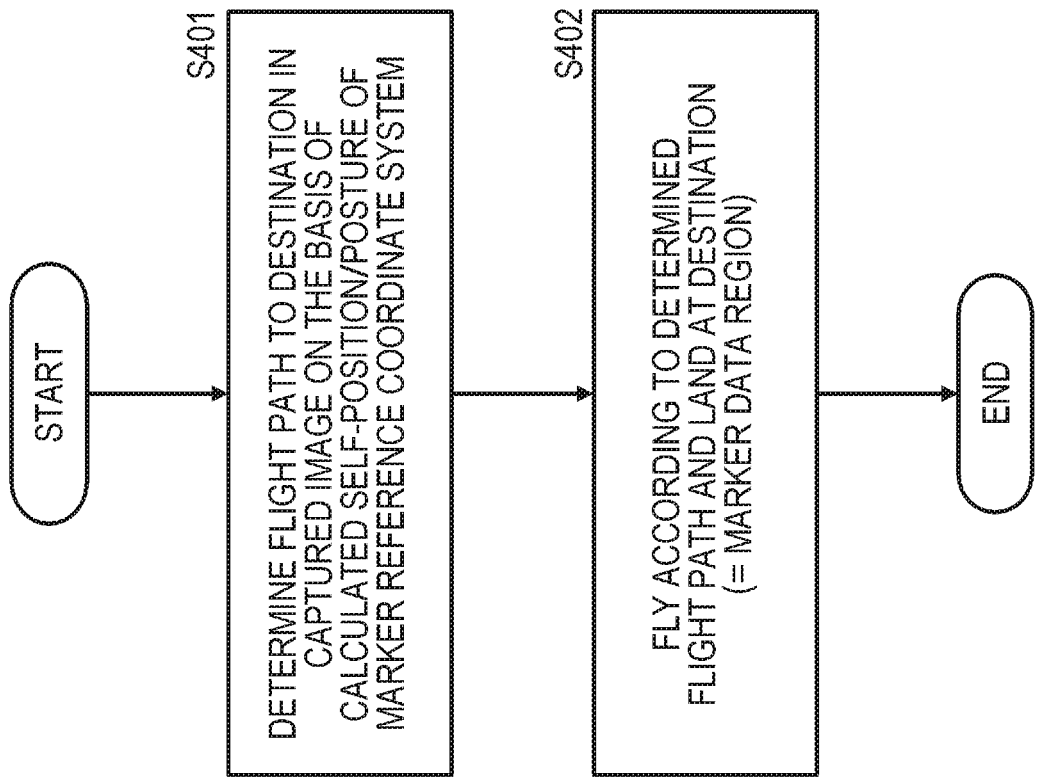
FIG. 28 is a flowchart illustrating a sequence of processing executed by the information processing device of the present disclosure.

FIG. 28 is a flowchart illustrating a landing sequence of the autonomous mobile body (drone) to a destination.

Note that the processing according to the flow illustrated in FIG. 28 is processing executed after the processing according to the flow illustrated in FIG. 27 is completed and the calculation of the self-position/posture according to the marker reference coordinates is completed.

Note that the processing according to this flow is processing executed by the autonomous mobile body (drone) 10. The processing of each step of the flow illustrated in FIG. 28 is executed using, for example, various processing execution units provided in each device such as a data processing unit and a camera of each device.

Hereinafter, processing of each step of the flow illustrated in FIG. 28 will be sequentially described.

(Step S401)

First, in step S401, the data processing unit of the autonomous mobile body (drone) 10 determines a flight path to a destination in the captured image on the basis of the self-position and posture of the marker reference coordinate system calculated according to the flow illustrated in FIG. 27 described above.

Note that the destination in the captured image is, for example, the destination set by the user 1 as described above with reference to FIGS. 21 and 22, and is the destination specified by the user 1 on the user terminal 50, the position of the destination in the marker reference coordinate system being calculated on the user terminal 50.

The user terminal 50 calculates the position of the destination in the marker reference coordinate system using the coordinate transformation matrix from the user terminal camera coordinates to the marker reference coordinates. Further, the user terminal 50 transmits the calculated position information of the destination in the marker reference coordinate system to the autonomous mobile body (drone) 10.

The autonomous mobile body (drone) 10 performs processing using the position information of the destination in the marker reference coordinate system received from the user terminal 50.

Note that, specifically, for example, a marker may be set as the destination.

In this case, the autonomous mobile body (drone) 10 may set the flight path so that the self-position is directed to the origin of the marker reference coordinates on the basis of the self-position and posture of the marker reference coordinate system.

(Step S402)

Next, in step S402, the data processing unit of the autonomous mobile body (drone) 10 flies according to the flight path determined in step S401 and lands at the destination.

(6-(5) Tracking Sequence of Tracking Target Imaged in Captured Image of Drone Camera of Autonomous Mobile Body (Drone))

Next, a tracking sequence of the tracking target imaged in the captured image of the drone camera of the autonomous mobile body (drone) will be described.

This processing example corresponds to, for example, the processing described above with reference to the upper part of FIG. 7, and is tracking processing in a case where a tracking target (target) is imaged in the captured image of the drone camera of the autonomous mobile body (drone) 10.

Figure 29:
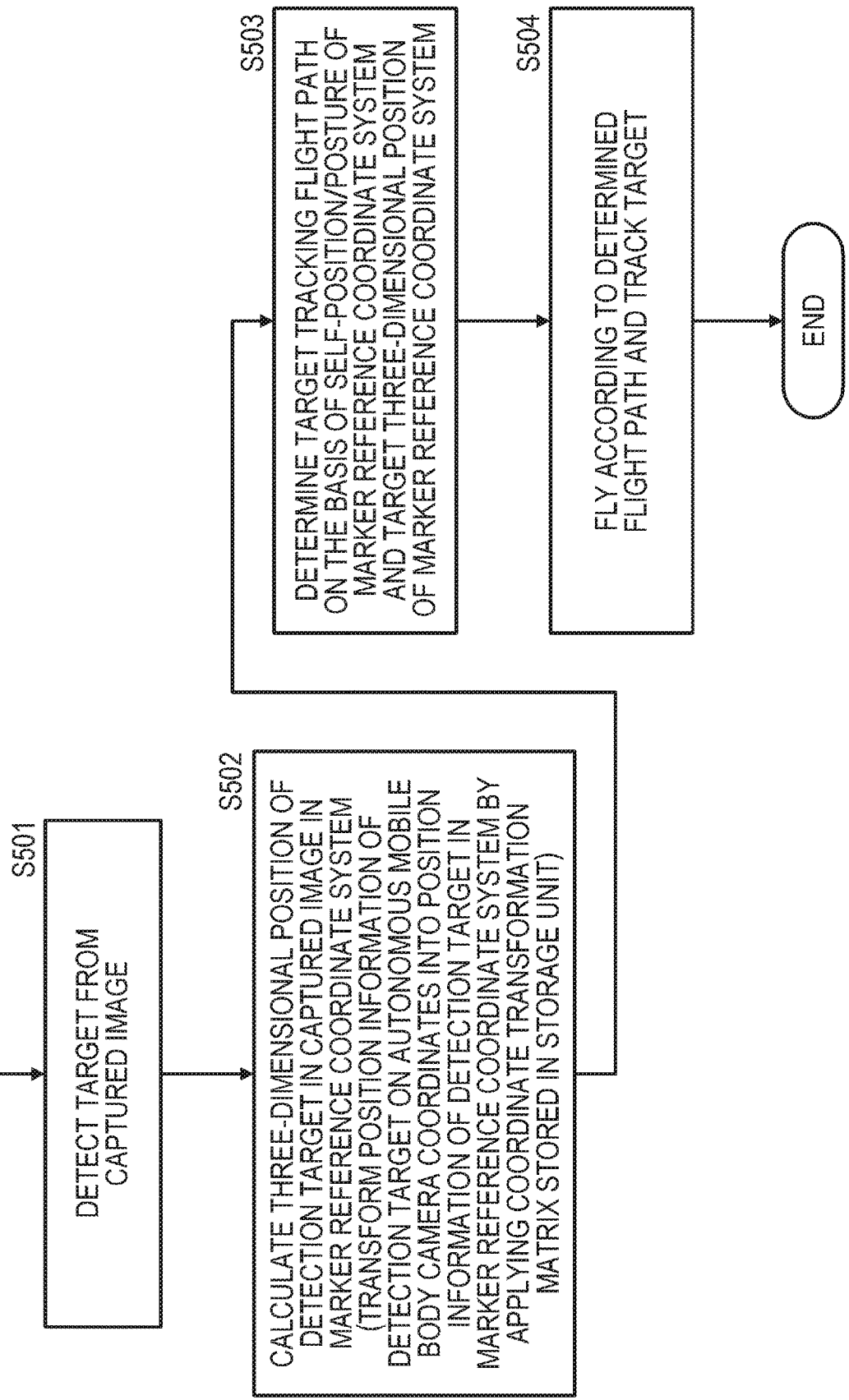
FIG. 29 is a flowchart illustrating a sequence of processing executed by the information processing device of the present disclosure.

FIG. 29 is a flowchart illustrating a tracking sequence of a tracking target imaged in a captured image of a drone camera of an autonomous mobile body (drone).

Note that the processing according to the flow illustrated in FIG. 29 is processing executed after the processing according to the flow illustrated in FIG. 27 is completed and the calculation of the self-position/posture according to the marker reference coordinates is completed.

(Step S501)

First, in step S501, the data processing unit of the autonomous mobile body (drone) 10 detects a target to be tracked from the captured image of the drone camera.

(Step S502)

Next, in step S502, the data processing unit of the autonomous mobile body (drone) 10 calculates a three-dimensional position of the detection target in the captured image in the marker reference coordinate system.

This processing can be calculated by transforming the target position information on the autonomous mobile body camera coordinates into the target position information in the marker reference coordinate system by applying the coordinate transformation matrix stored in the storage unit.

(Step S503)

Next, in step S503, the data processing unit of the autonomous mobile body (drone) 10 determines the target tracking flight path on the basis of the self-position and posture in the marker reference coordinate system and the target three-dimensional position in the marker reference coordinate system.

(Step S504)

Next, in step S504, the data processing unit of the autonomous mobile body (drone) 10 flies according to the flight path determined in step S503 and tracks the target.

(6-(6) Tracking Sequence of Tracking Target Imaged in Captured Image of User Terminal Camera of User Terminal)

Next, a tracking sequence of the tracking target imaged in the captured image of the user terminal camera of the user terminal will be described.

This processing example corresponds to, for example, the processing described above with reference to the lower part of FIG. 7 and FIG. 22, and is tracking processing in a case where the tracking target (target) cannot be imaged in the captured image of the drone camera of the autonomous mobile body (drone) 10 and the tracking target (target) is imaged in the captured image of the user terminal camera of the user terminal 50.

Figure 30:
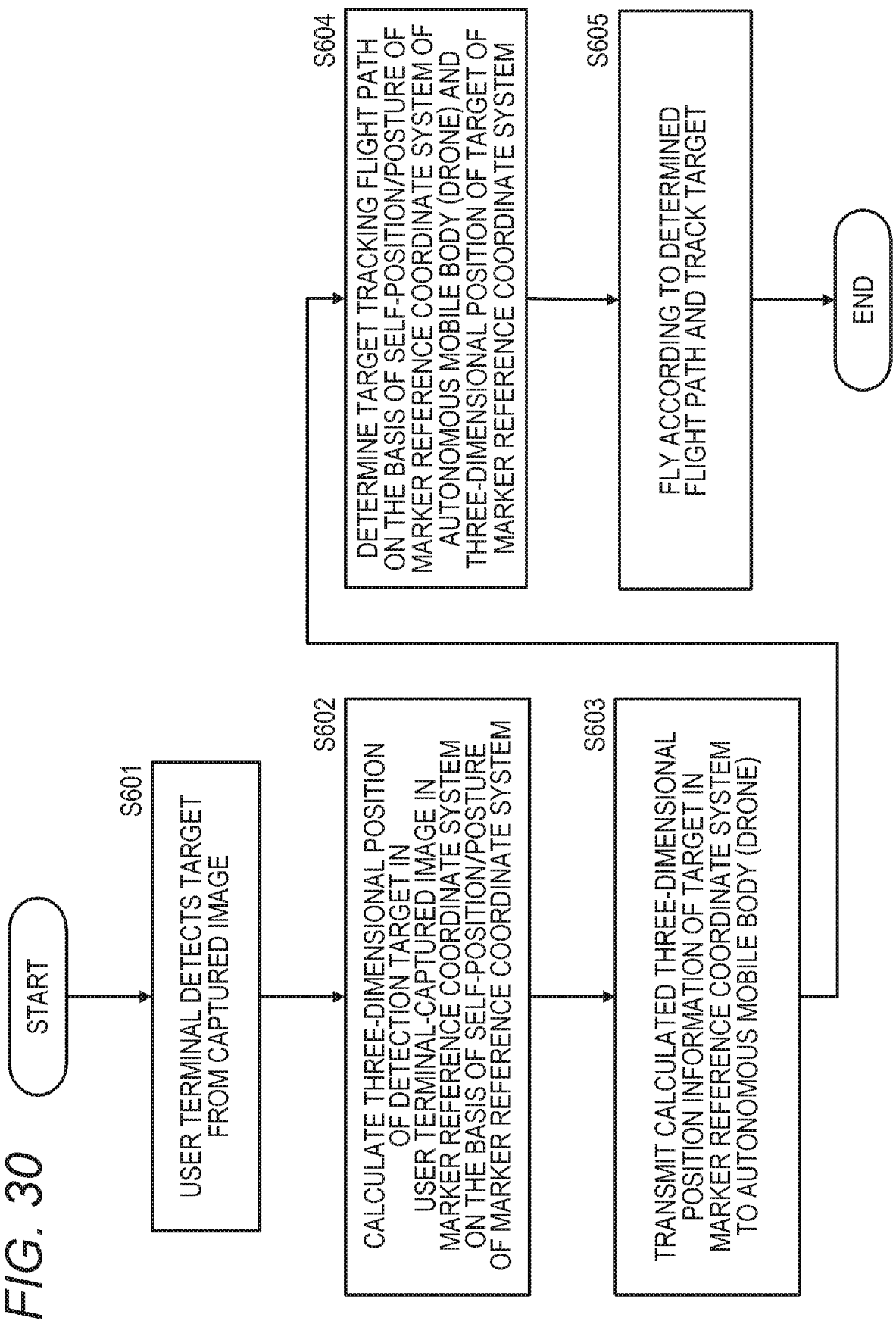
FIG. 30 is a flowchart illustrating a sequence of processing executed by the information processing device of the present disclosure.

FIG. 30 is a flowchart illustrating a tracking sequence of a tracking target imaged in a captured image of the user terminal camera of the user terminal.

Note that the processing according to the flow illustrated in FIG. 30 is processing executed after the processing according to the flow illustrated in FIG. 27 is completed and the calculation of the self-position/posture according to the marker reference coordinates is completed.

(Step S601)

First, in step S601, the data processing unit of the user terminal 50 detects a target to be tracked from the captured image of the user terminal camera.

(Step S602)

Next, in step S602, the data processing unit of the user terminal 50 calculates the three-dimensional position of the detection target in the captured image in the marker reference coordinate system.

This processing can be calculated by transforming the target position information on the user terminal camera coordinates into the target position information in the marker reference coordinate system by applying the coordinate transformation matrix stored in the storage unit.

(Step S603)

Next, in step S603, the data processing unit of the user terminal 50 transmits the target position information in the marker reference coordinate system calculated in step S602 to the autonomous mobile body (drone) 10.

(Step S604)

Next, in step S604, the data processing unit of the autonomous mobile body (drone) 10 determines a target tracking flight path on the basis of the self-position and posture in the marker reference coordinate system and the target three-dimensional position in the marker reference coordinate system received from the user terminal 50.

(Step S605)

Next, in step S605, the data processing unit of the autonomous mobile body (drone) 10 flies according to the flight path determined in step S604 and tracks the target.

[7. Configuration Example of Information Processing Device of Present Disclosure]

Next, configuration examples of the information processing device of the present disclosure, that is, the autonomous mobile body (drone) 10 and the user terminal 50 will be described.

Figure 31:
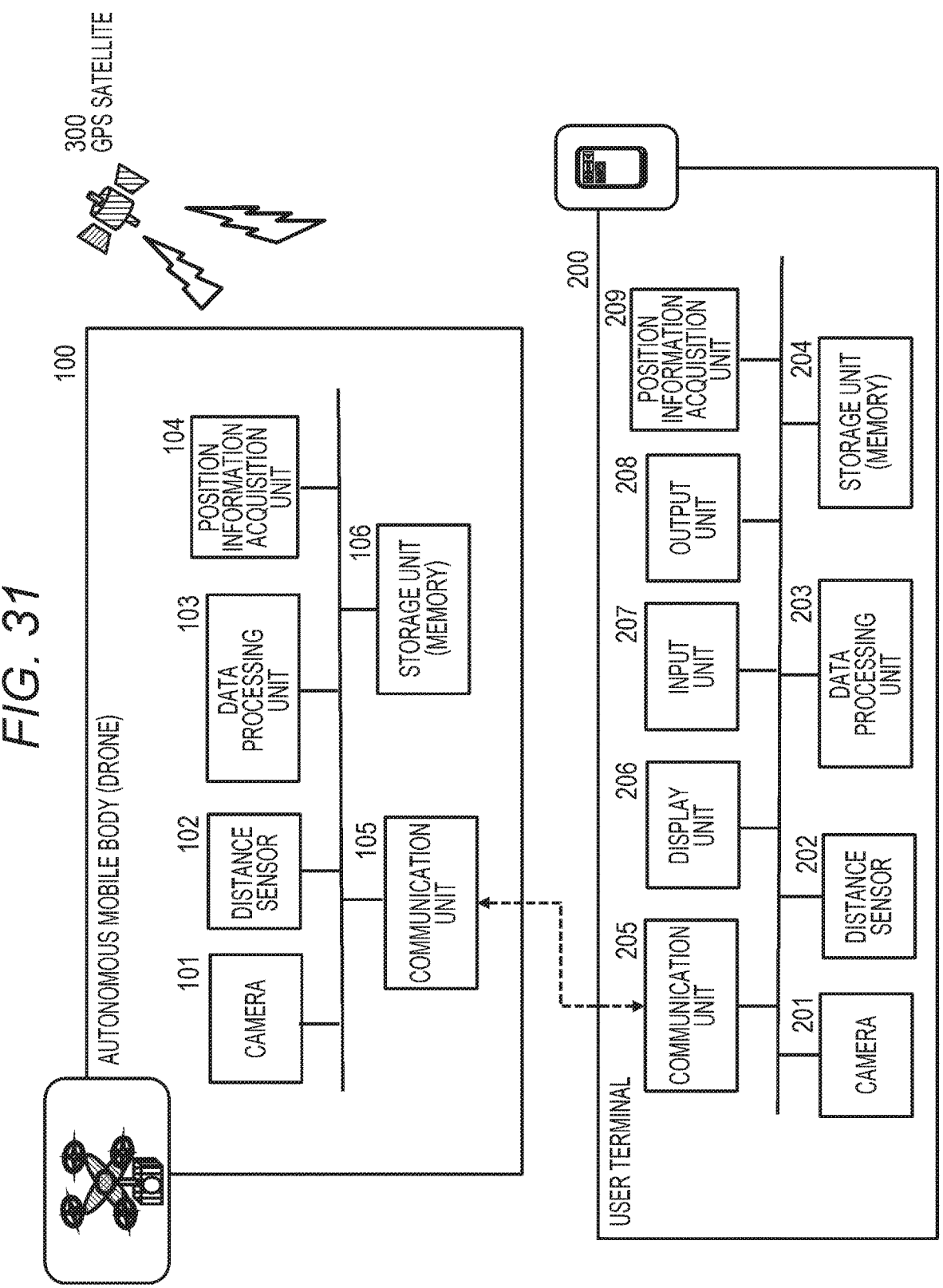
FIG. 31 is a diagram illustrating a configuration example of the information processing device of the present disclosure.

FIG. 31 is a diagram illustrating configuration examples of an autonomous mobile body (drone) 100 as an information processing device of the present disclosure and a user terminal 200.

Note that the user terminal 200 as the information processing device of the present disclosure is, for example, a camera-equipped communication terminal such as a smartphone. The device is not limited to the smart phone, and may be a device such as a PC or a camera device.

Furthermore, the autonomous mobile body 100 as the information processing device of the present disclosure is not limited to a drone, and may be a robot, an automated vehicle, or the like.

The autonomous mobile body (drone) 100 and the user terminal 200 can communicate with each other, and further have a configuration capable of communicating with an external server, for example, a drone management server. Furthermore, the autonomous mobile body (drone) 100 and the user terminal 200 can acquire position information using communication information with the GPS satellite 300.

As illustrated in the drawing, the autonomous mobile body (drone) 100 includes a camera 101, a distance sensor 102, a data processing unit 103, a position information acquisition unit 104, a communication unit 105, and a storage unit (memory) 106.

The camera 101 is used, for example, for imaging processing of a drone or image capturing during SLAM processing.

The distance sensor 102 acquires data for calculating the distance to the object in the camera-captured image.

Note that, in a case where the camera 101 is a camera capable of measuring an object distance, such as a stereo camera, the distance sensor 102 does not need to be provided.

The data processing unit 103 executes the above-described various processing.

For example, generation of marker data, generation of a coordinate transformation matrix, flight control of a drone, calculation of a flight path, a destination, and a three-dimensional position of a target to be followed, and the like are performed.

Furthermore, control of processing executed in the autonomous mobile body 100, such as SLAM processing and image capturing control, is performed.

The data processing unit 103 includes, for example, a processor such as a CPU having a program execution function, and executes processing according to a program stored in the storage unit 106.

For example, the position information acquisition unit 104 executes communication with the GPS satellite 300, analyzes the current position (latitude, longitude, height) of the autonomous mobile body (drone) 100 on the basis of the communication information with the GPS satellite 300, and outputs the analysis information to the data processing unit 103.

The communication unit 105 executes communication with the user terminal 200 or an external server.

The storage unit (memory) 106 is used as a storage area and a work area of a program executed by the data processing unit 103. It is also used as a storage area for various parameters applied to processing. The storage unit (memory) 106 includes a RAM, a ROM, and the like.

Next, a configuration of the user terminal 200 will be described. As illustrated in the drawing, the user terminal 200 includes a camera 201, a distance sensor 202, a data processing unit 203, a storage unit (memory) 204, a communication unit 205, a display unit 206, an input unit 207, an output unit 208, and a position information acquisition unit 209.

The camera 201 is used, for example, for imaging processing of a drone or image capturing during SLAM processing.

The distance sensor 202 acquires data for calculating the distance to the object in the camera-captured image.

Note that, in a case where the camera 201 is a camera capable of measuring an object distance, such as a stereo camera, the distance sensor 202 does not need to be provided.

The data processing unit 203 executes the above-described various processing.

For example, generation of marker data, generation of a coordinate transformation matrix, calculation of a flight path of a drone, a destination, and a three-dimensional position of a target to be followed, and the like are performed.

Furthermore, control of processing executed in the user terminal 200, such as SLAM processing and image capturing control, is performed.

The data processing unit 203 includes, for example, a processor such as a CPU having a program execution function, and executes processing according to a program stored in the storage unit 204.

The storage unit (memory) 204 is used as a storage area and a work area of a program executed by the data processing unit 203. It is also used as a storage area for various parameters applied to processing. The storage unit (memory) 204 includes a RAM, a ROM, and the like.

The communication unit 205 executes communication with the autonomous mobile body (drone) 100 and an external server. For example, processing of receiving flight path information of the autonomous mobile body (drone) 100 from the autonomous mobile body (drone) 100 or other processing is performed.

The display unit 206 displays the camera-captured image and further outputs flight path information of the drone generated by the data processing unit 203 and the like. That is, an AR image or the like in which a flight path is superimposed on a real image of a drone or the like is displayed.

The input unit 207 is an operation unit by the user, and is used for various processing, for example, input processing of a user request such as image capturing, start and end of path display, and the like.

The output unit 208 includes a sound output unit, an image output unit, and the like.

For example, the position information acquisition unit 209 executes communication with the GPS satellite 300, analyzes the current position (latitude, longitude, height) of the user terminal 200 on the basis of the communication information with the GPS satellite 300, and outputs the analysis information to the data processing unit 203.

Note that, in the above-described embodiment, the processing example in which the autonomous mobile body is mainly a drone has been described. However, the processing of the present disclosure is not limited to a drone, and can be also applied to other mobile bodies, for example, a robot and an automated vehicle.

Similar processing can be performed by replacing the drone in the above-described embodiment with a robot or an automated vehicle.

[8. Summary of Configuration of Present Disclosure]

Hereinabove, the embodiments of the present disclosure have been described in detail with reference to specific embodiments. However, it is obvious that those skilled in the art can make modifications and substitutions of the embodiments without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in the present specification can have the following configurations.

(1) An information processing method executed in an information processing device, the information processing method including:
setting, by a data processing unit, a real object included in a camera-captured image of the information processing device as a marker, and generating marker reference coordinates with a configuration point of the set marker as an origin; and
transmitting, by the data processing unit, position data on the marker reference coordinates to another device by using the marker reference coordinates as coordinates shared with the another device.

(2) The information processing method according to (1), in which the data processing unit
executes processing of setting a user-designated area for the camera-captured image as a marker.
Information processing of (3) The information processing method according to (1) or (2),
in which the data processing unit
executes processing of acquiring feature point information of the marker included in the camera-captured image, generating marker data including the feature point information of the marker and information of the marker reference coordinates, and storing the generated marker data in a storage unit.

(4) The information processing method according to (3),
in which the data processing unit
shares the marker data with the another device.

(5) The information processing method according to any one of (1) to (4),
in which the data processing unit
generates a coordinate transformation matrix to be applied to transformation of position data of information processing device camera coordinates, which is a coordinate system unique to a camera of the information processing device, and position data of the marker reference coordinates, and stores the coordinate transformation matrix in a storage unit.

(6) The information processing method according to (5),
in which the data processing unit
executes self-position/posture calculation processing using the camera-captured image of the information processing device to generate the coordinate transformation matrix using a self-position/posture calculation result.

(7) The information processing method according to (6),
in which the data processing unit
executes the self-position/posture calculation processing by simultaneous localization and mapping (SLAM) processing.

(8) The information processing method according to any one of (5) to (7),
in which the another device is a mobile device, and the data processing unit
transforms a destination position of the mobile device,
from a coordinate position on the information processing device camera coordinates into a coordinate position on the marker reference coordinates by applying the coordinate transformation matrix, and transmits the transformed coordinate position to the mobile device.

(9) The information processing method according to any one of (5) to (8),
in which the another device is a mobile device, and the data processing unit
receives, from the mobile device, a movement path of the mobile device as coordinate position data on the marker reference coordinates,
transforms the movement path of the mobile device,
from a coordinate position on the marker reference coordinates into a coordinate position on the information processing device camera coordinates by applying the coordinate transformation matrix, and displays the transformed coordinate position on a display unit that displays the camera-captured image of the information processing device.

(10) The information processing method according to (9),
in which the data processing unit
generates and displays an augmented reality (AR) image in which the movement path of the mobile device is superimposed as a virtual object on a real object that is the camera-captured image displayed on the display unit.

(11) The information processing method according to any one of (5) to (10),
in which the another device is a mobile device, and
the data processing unit
transforms a position of a tracking target to be tracked by the mobile device,
from a coordinate position on the information processing device camera coordinates into a coordinate position on the marker reference coordinates by applying the coordinate transformation matrix, and transmits the transformed coordinate position to the mobile device.

(12) The information processing method according to any one of (1) to (11),
in which the information processing device
is a portable terminal having a camera function or a wearable terminal having a camera function.

(13) An information processing device including:
a camera that captures an image; and
a data processing unit that sets a real object included in the camera-captured image as a marker, and generates marker reference coordinates with a configuration point of the set marker as an origin, and
that transmits position data on the marker reference coordinates to another device by using the marker reference coordinates as coordinates shared with the another device.

(14) A mobile device including:
a data processing unit that executes movement control of the mobile device; and
a camera that captures an image,
in which the data processing unit
detects a predetermined marker from a real object included in the captured image of the camera, and analyzes a position of the real object included in the captured image of the camera by using marker reference coordinates with a configuration point of the detected marker as an origin.

(15) The mobile device according to (14),
in which the data processing unit
includes a storage unit that stores a coordinate transformation matrix to be applied to transformation of position data of mobile device camera coordinates, which is a coordinate system unique to the camera, and position data of the marker reference coordinates, and
the data processing unit
uses the coordinate transformation matrix stored in the storage unit
to calculate a position of the marker detected from the captured image on the marker reference coordinates.

(16) An information processing system including a mobile device and a user terminal,
in which the mobile device stores, in a storage unit,
marker data including feature point information of a marker that is a real object that can be imaged by a camera of the mobile device and marker reference coordinate information with a configuration point of the marker as an origin, and
a coordinate transformation matrix to be applied to transformation of position data of mobile device camera coordinates, which is a coordinate system unique to the camera of the mobile device, and position data of the marker reference coordinates,
the user terminal stores, in a storage unit,
marker data including feature point information of a marker that is a real object that can be imaged by a camera of the user terminal and marker reference coordinate information with a configuration point of the marker as an origin, and
a coordinate transformation matrix to be applied to transformation of position data of user terminal camera coordinates, which is a coordinate system unique to the camera of the user terminal, and position data of the marker reference coordinates, and
the mobile device and the user terminal
transmit and receive a position of an object included in a camera-captured image of each device or movement path information of the mobile device as position information on the marker reference coordinates.

(17) A program for causing an information processing device to execute information processing, the program causing
a data processing unit to execute processing of:
setting a real object included in a camera-captured image of the information processing device as a marker, and generating marker reference coordinates with a configuration point of the set marker as an origin; and
transmitting position data on the marker reference coordinates to another device by using the marker reference coordinates as coordinates shared with the another device.

Furthermore, the series of processing described in the specification can be executed by hardware, software, or a combined configuration of both. In the case of executing processing by software, a program recording a processing sequence can be installed and executed in a memory in a computer incorporated in dedicated hardware, or the program can be installed and executed in a general-purpose computer capable of executing various types of processing. For example, the program can be recorded in advance in a recording medium. In addition to installation from the recording medium to the computer, the program can be received via a network such as a local area network (LAN) or the Internet and installed in a recording medium such as a built-in hard disk.

Note that, the various types of processing described in the specification may be executed not only in time series according to the description but also in parallel or individually according to the processing capability of the device that executes the processing or as necessary. Furthermore, in the present specification, a system is a logical set configuration of a plurality of devices, and is not limited to a system in which devices of respective configurations are in the same housing.

INDUSTRIAL APPLICABILITY

As described above, according to the configuration of one embodiment of the present disclosure, a configuration enabling processing of displaying a flight path of a drone on a live-action image of the drone, and the like is realized.

Specifically, for example, a data processing unit of a user terminal sets a real object included in a camera-captured image as a marker, generates marker reference coordinates with a configuration point of the set marker as an origin, and transmits position data on the marker reference coordinates to a mobile device such as a drone by using the marker reference coordinates as coordinates shared with another device, for example, a mobile device such as a drone. For example, the data processing unit transforms the destination position of the drone or the position of the tracking target from the coordinate position on the user terminal camera coordinates to the coordinate position on the marker reference coordinates by applying the coordinate transformation matrix, and transmits the transformed coordinate position to the drone. In addition, the data processing unit receives the movement path from the drone as coordinate position data on the marker reference coordinates, transforms the coordinate position data into a coordinate position on the user terminal camera coordinates by applying the coordinate transformation matrix, and displays the path information on the display unit.

With this configuration, a configuration enabling processing of displaying the flight path of the drone on the live-action image of the drone or the like is realized.

REFERENCE SIGNS LIST

10 Autonomous mobile body
11 Autonomous mobile body-held marker data
20 Controller
50 User terminal
51 User terminal-held marker data
70 Marker
100 Autonomous mobile body
101 Camera
102 Distance sensor
103 Data processing unit
104 Position information acquisition unit
105 Communication unit
106 Storage unit (memory)
200 User terminal
201 Camera
202 Distance sensor
203 Data processing unit
204 Storage unit (memory)
205 Communication unit
206 Display unit
207 Input unit
208 Output unit
209 Position information acquisition unit
300 GPS satellite

The invention claimed is:

1. An information processing method comprising:
setting, by a data processing unit of an information processing device, a real object in an image as a marker, wherein the image is captured by a camera of the information processing device;
generating, by the data processing unit, marker reference coordinates in a marker reference coordinate system in which a configuration point of the marker is an origin;
storing, by the data processing unit, marker data associated with the marker in a storage unit of the information processing device, wherein
the marker data includes a position and a posture of the camera at a marker registration time point of the marker, and
the position and the posture of the camera are in the marker reference coordinate system; and
transmitting, by the data processing unit, based on the stored marker data, first position data in the marker reference coordinate system to a mobile device.

2. The information processing method according to claim 1, further comprising setting, by the data processing unit, a user-designated area in the image as the marker.

3. The information processing method according to claim 1, further comprising:
acquiring, by the data processing unit, feature point information of the marker in the image; and
generating, by the data processing unit, the marker data that includes the feature point information of the marker and information of the marker reference coordinates.

4. The information processing method according to claim 3, further comprising transmitting, by the data processing unit, the marker data to the mobile device.

5. The information processing method according to claim 1, further comprising:
generating, by the data processing unit, a coordinate transformation matrix for transformation of second position data in a camera coordinate system of the information processing device to the first position data in the marker reference coordinate system; and
storing, by the data processing unit, the coordinate transformation matrix in the storage unit.

6. The information processing method according to claim 5, further comprising:
calculating, by the data processing unit, a position and a posture of the information processing device based on the image; and
generating, by the data processing unit, the coordinate transformation matrix based on the position and the posture of the information processing device.

7. The information processing method according to claim 6, further comprising calculating, by the data processing unit, the position and the posture of the information processing device by simultaneous localization and mapping (SLAM) processing.

8. The information processing method according to claim 5, further comprising:
transforming, by the data processing unit, based on the coordinate transformation matrix, a first coordinate position of a destination of the mobile device in the camera coordinate system of the information processing device into a second coordinate position of the destination in the marker reference coordinate system; and
transmitting, by the data processing unit, the second coordinate position to the mobile device.

9. The information processing method according to claim 5, further comprising:
receiving, by the data processing unit, from the mobile device, a movement path of the mobile device as first coordinate position data in the marker reference coordinate system;
transforming, by the data processing unit, the first coordinate position data in the marker reference coordinate system into second coordinate position data in the camera coordinate system of the information processing device, wherein the transformation of the first coordinate position data is based on the coordinate transformation matrix; and
controlling, by the data processing unit, a display unit of the information processing device to display the second coordinate position data and the image.

10. The information processing method according to claim 9, further comprising controlling, by the data processing unit, the display unit to display an augmented reality (AR) image in which the movement path of the mobile device is superimposed as a virtual object on the image.

11. The information processing method according to claim 5, further comprising:
transforming, by the data processing unit, a first coordinate position of a tracking target in the camera coordinate system of the information processing device into a second coordinate position of the tracking target in the marker reference coordinate system, wherein the transformation of the first coordinate position of the tracking target is based on the coordinate transformation matrix; and
transmitting, by the data processing unit, the second coordinate position of the tracking target to the mobile device.

12. The information processing method according to claim 1, wherein the information processing device is one of a portable terminal having a camera function or a wearable terminal having the camera function.

13. An information processing device, comprising:
a storage unit;
a camera configured to capture an image that includes a real object; and
a data processing unit configured to:
set the real object in the image as a marker;
generate marker reference coordinates in a marker reference coordinate system in which a configuration point of the marker is an origin;
store marker data associated with the marker in the storage unit, wherein
the marker data includes a position and a posture of the camera at a marker registration time point of the marker, and
the position and the posture of the camera are in the marker reference coordinate system; and
transmit, based on the stored marker data, position data in the marker reference coordinate system to a mobile.

14. A mobile device, comprising:
a camera configured to capture an image that includes a real object;
a storage unit configured to store marker data associated with a marker, wherein
the marker data includes a position and a posture of the camera at a marker registration time point of the marker, and
the position and the posture of the camera are in a marker reference coordinate system in which a configuration point of the marker is an origin; and
a data processing unit configured to:
detect the marker from the real object;
analyze a position of the real object based on the stored marker data and the detected marker; and
control movement of the mobile device based on the position of the real object.

15. The mobile device according to claim 14, wherein
the storage unit is further configured to store a coordinate transformation matrix for transformation of first position data in a camera coordinate system of the mobile device into second position data in the marker reference coordinate system, and
the data processing unit is further configured to calculate, based on the stored coordinate transformation matrix, a position of the detected marker in the marker reference coordinate system.

16. An information processing system, comprising:
a mobile device that includes:
a first camera configured to capture a first image of a real object;
a first storage unit configured to store:
first marker data that includes:
feature point information of a marker that corresponds to the real object in the first image captured by the first camera, and
a position and a posture of the first camera at a marker registration time point of the marker, wherein the position and the posture of the first camera are in a marker reference coordinate system in which a configuration point of the marker is an origin, and
a first coordinate transformation matrix; and
a first data processing unit configured to:
receive first position information in the marker reference coordinate system, wherein the first position information includes a position of the real object; and
transform, based on the first coordinate transformation matrix, the first position information in the marker reference coordinate system into second position information in a camera coordinate system of the mobile device; and
a user terminal that includes:
a second camera configured to capture a second image of the real object;
a second storage unit configured to store:
second marker data that includes:
the feature point information of the marker that corresponds to the real object in the second image captured by the second camera, and
a position and a posture of the second camera at the marker registration time point of the marker, wherein the position and the posture of the second camera are in the marker reference coordinate system, and
a second coordinate transformation matrix; and
a second data processing unit configured to:
transform, based on the second coordinate transformation matrix, third position information in a camera coordinate system of the user terminal into the first position information in the marker reference coordinate system; and
transmit the first position information in the marker reference coordinate system to the mobile device.

17. A non-transitory computer-readable medium having stored thereon computer-executable instructions which, when executed by an information processing device, cause the information processing device to execute operations, the operations comprising:
setting a real object in an image as a marker, wherein the image is captured by a camera of the information processing device;
generating marker reference coordinates in a marker reference coordinate system in which a configuration point of the marker is an origin;
storing marker data associated with the marker in a storage unit of the information processing device, wherein
the marker data includes a position and a posture of the camera at a marker registration time point of the marker, and
the position and the posture of the camera are in the marker reference coordinate system; and
transmitting, based on the stored marker data, position data in the marker reference coordinate system to a mobile.

* * * * *